United States Patent
Baumgart et al.

(10) Patent No.: US 10,812,533 B2
(45) Date of Patent: Oct. 20, 2020

(54) POSITIONALLY-ENCODED STRING REPRESENTATIONS, INCLUDING THEIR USE IN MACHINE LEARNING

(71) Applicant: SAP SE, Walldorf (DE)

(72) Inventors: Marvin Baumgart, Mountain View, CA (US); Viktor Povalyayev, Santa Clara, CA (US); David C. Hu, Palo Alto, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/503,387

(22) Filed: Jul. 3, 2019

(65) Prior Publication Data

US 2019/0327274 A1   Oct. 24, 2019

Related U.S. Application Data

(63) Continuation of application No. 15/594,086, filed on May 12, 2017, now Pat. No. 10,375,120.

(51) Int. Cl.
*G06F 21/00* (2013.01)
*H04L 29/06* (2006.01)
(Continued)

(52) U.S. Cl.
CPC ............ *H04L 63/205* (2013.01); *G06F 21/34* (2013.01); *G06N 20/00* (2019.01); *H04L 63/101* (2013.01); *G06F 16/2445* (2019.01)

(58) Field of Classification Search
None
See application file for complete search history.

(56) References Cited

U.S. PATENT DOCUMENTS

2003/0200212 A1  10/2003  Benson et al.
2003/0200235 A1  10/2003  Choy et al.
(Continued)

OTHER PUBLICATIONS

Kanuga, Punit; Chauhan, Anamika. Adaptive hashing based multiple variable length pattern search algorithm for large data sets. 2014 International Conference on Data Science & Engineering (ICDSE). https://ieeexplore.ieee.org/stamp/stamp.jsp?tp=&arnumber=6974624 (Year: 2014).*

(Continued)

*Primary Examiner* — Jeremiah L Avery
(74) *Attorney, Agent, or Firm* — Klarquist Sparkman, LLP

(57) ABSTRACT

String comparison, including comparing strings with a rule, can be time consuming, and strings may not be suitable for analysis using machine learning algorithms. The present disclosure provides positionally-encoded representations of strings, such as binary matrices or arrays, that provide an encoded representation of the string. The encoding, and decoding, can be facilitated by an encoding schema, such as an encoding schema stored in the memory of a computer device. The encoding schema associates particular characters with particular positions in an array. The positionally-encoded string representations can be used for security applications, such as to determine whether an authorization token that includes at least one string complies with an authorization rule. The authorization rule can be specified as a positionally-encoded representation that defines a set of strings that comply with the rule.

20 Claims, 20 Drawing Sheets

(51) Int. Cl.
    *G06N 20/00* (2019.01)
    *G06F 21/34* (2013.01)
    *G06F 16/242* (2019.01)

(56) References Cited

U.S. PATENT DOCUMENTS

| | | | |
|---|---|---|---|
| 2004/0127682 | A1 | 7/2004 | Neville et al. |
| 2004/0199241 | A1 | 10/2004 | Gravett et al. |
| 2005/0021348 | A1 | 1/2005 | Chan et al. |
| 2005/0240943 | A1* | 10/2005 | Smith ............ G06F 9/465 719/328 |
| 2005/0262551 | A1 | 11/2005 | Chen et al. |
| 2008/0127162 | A1 | 5/2008 | Xu et al. |
| 2008/0307488 | A1* | 12/2008 | Hammond, II ...... H04L 63/20 726/1 |
| 2009/0077618 | A1* | 3/2009 | Pearce ............ H04L 63/20 726/1 |
| 2010/0189251 | A1* | 7/2010 | Curren .......... G06F 21/6227 380/28 |
| 2010/0325418 | A1* | 12/2010 | Kanekar ......... H04L 63/0823 713/151 |
| 2011/0251930 | A1 | 10/2011 | Yu et al. |
| 2012/0054142 | A1 | 3/2012 | Du et al. |
| 2012/0150859 | A1 | 6/2012 | Hu |
| 2013/0090977 | A1 | 4/2013 | Zeng et al. |
| 2013/0091066 | A1 | 4/2013 | Zeng et al. |
| 2013/0124292 | A1* | 5/2013 | Juthani ............. H04L 63/083 705/14.26 |
| 2013/0145419 | A1 | 6/2013 | Hu |
| 2013/0304535 | A1 | 11/2013 | Hu et al. |
| 2014/0100910 | A1 | 4/2014 | Zeng et al. |
| 2014/0304505 | A1* | 10/2014 | Dawson ........... H04L 63/0428 713/165 |
| 2016/0098572 | A1 | 4/2016 | Povalyayev et al. |
| 2016/0162820 | A1 | 6/2016 | Povalyayev et al. |

OTHER PUBLICATIONS

Liu, Lianzhong; Gai, Jingfen. Bloom Filter Based Index for Query over Encrypted Character Strings in Database. 2009 WRI World Congress on Computer Science and Information Engineering. https://ieeexplore.ieee.org/stamp/stamp.jsp?tp=&arnumber=5171182 (Year: 2009).*
Ringling, Sven, "When and How to Use Custom Development to Optimise SAP ERP HCM Authorizations," retrieved from https://www.slideshare.net/sringling/optimising-sap-hr-authorisation-by-using-custom-development-incl-badis, on or before May 2017, 60 pages.
Lamotte-Schubert, et al., "Analysis of Authorizations in SAP R/3*," *First-order Theorem Proving FTP 2009*, pp. 90-104, 2009.
Moalla, et al., "Context-Sensitive Realization of the Authorization Check in HR Master Data," retrieved from https://www.sapusers.org/uploads/files/179, on or before May 2017, 16 pages.
Lamotte-Schubert, Manuel, "Automatic Authorization Analysis," retrieved from http://scidok.sulb.uni-saarland.de/volltexte/2015/6257/pdf/thesis_final, 2015, 134 pages.
"Use Neural Network to predict outcome on strings being the conditions," retrieved from http://stackoverflow.com/questions/37749188/use-neural-network-to-predict-outcome-on-strings-being-the-conditions, on or before May 2017, 1 page.
"String metric," retrieved from https://en.wikipedia.org/wiki/String_metric, on or before May 2017, 2 pages.
"String input in Machine Learning," retrieved from https://cs.stackexchange.com/questions/14488/string-inputs-in-machine-learning, on or before May 2017, 2 pages.
"Working with string data and classifications in Weka," retrieved from http://stackoverflow.com/questions/15239913/working-with-string-data-and-classification-in-weka, on or before May 2017, 1 page.
"What are Authorization Objects," retrieved from https://wiki.scn.sap.com/wiki/display/ABAP/What+are+Authorization+Objects, on or before May 2017, 1 page.
"Authorization Objects—A Simple Guide," retrieved from https://www.slideshare.net/AlbertShumov/authorization-objects-a-simple-guide-16989353, on or before May 2017, 6 pages.
"What is an authorization object?" retrieved from http://sapsecurityguide.com/security/what-is-an-authorization-object/, on or before May 2017, 3 pages.
Cavalleri et al, "100 Things You Should Know About Authorization in SAP," retrieved from https://chapters.theiia.org/los-angeles/Events/Documents/IIA Los Angeles SAP Security Presentation, on or before May 2017, 27 pages.
"Access & Authorization Management," retrieved from https://www.tutorialspoint.com/sap_grc/sap_grc_access_authorization_management.htm, on or before May 2017, 5 pages.
"SAP ABAP Table HRVIEW (Authorization View)," retrieved from https://www.sapdatasheet.org/abap/tabl/hrview.html, on or before May 2017, 1 page.
"Where Using List for SAP ABAP Function Module RH_Date_View_Fill (Fill Authorization Interval Table)," retrieved from https://www.sapdatasheet.org/wil/abap/func/rh_date_view_fill/tabl.html, on or before May 2017, 1 page.
"RH_Date_VIEW_FILL SAP Function module—Fill Authorization Interval Table," retrieved from http://www.se80.co.uk/sapfms/r/rh_d/rh_date_view_fill.htm, on or before May 2017, 4 pages.
Leenen, Iwin, "An Evaluation of Two Algorithms for Hierarchical Classes Analysis," *Journal of Classification*, 18: 57-80, 2001.
Leenen, et al., "Models for Ordinal Hierarchical Classes Analysis," *Psychometrika*, 66(3): 389-404, 2001.
"Literal (computer programming)," retrieved from https://en.wikipedia.org/wiki/Literal_(computer_programming), on or before May 2017, 2 pages.
"C++ compare two string literals," retrieved from http://stackoverflow.com/questions/11144118/c-compare-two-string-literals, on or before May 2017, 2 pages.
"String literals vs c-strings," retrieved from https://cboard.cprogramming.com/cplusplus-programming/37185-string-literals-vs-c-strings.html, on or before May 2017, 8 pages.
Ho, Ricky, "An Introduction to 6 Machine Learning Models," retrieved from https://dzone.com/articles/introduction-6-machine, on or before May 2017, 17 pages.
Levitt, Jonathan, "SAP Security Concepts, Segregation of Duties, Sensitive Access & Mitigating Controls," retrieved from https://chapters.theiia.org/los-angeles/Events/Documents/IIA Los Angeles SAP Security Presentation, on or before May 2017, 36 pages.
Mysyk, Sergiy, "Securing GRC—designing effective security within GRC Access Control," retrieved from http://events.asug.com/2013AC/Business Integration Technology & Infrastructure/0907 Securing GRC designing effective security, on or before May 2017, 42 pages.
Saxena et al., "Authentication and Authorization Scheme for Various User Roles and Devices in Smart Grid," IEEE Transactions on Information Forensics and Security, vol. 11, Issue 5, https://ieeexplore.ieee.org/stamp/stamp.jsp?tp=&arnumber=7366583 (Year 2015).
Ohba et al., "An Authentication Client Proxy Mechanism for Resource-Constrained Devices," PES T&D 2012, https://ieeexplore.ieee.org/stamp/stamp.jsp?tp=arnumber=6281464 (Year 2012).
Jose et al., "Securing Passwords from Dictionary Attack with Character-Tree," 2016 International Conference on Wireless Communications, Signal Processing and Networking (WiSPNET), https://ieeexplore.ieee.org/stamp/stamp.jsp?tp=&arnumber=7566553 (Year 2016).
Notice of Allowance, received in U.S. Appl. No. 15/594,086, dated Mar. 26, 2019, 12 pages.

* cited by examiner

```
#ifndef DIMENSIONS_H_
define DIMENSIONS_H_ namespace DIM
{
        // x axis { A = 11   36 = Z } or interface
        const char xAxis[] = {
                '*','0','1','2','3','4','5','6','7','8','9',
                'A','B','C','D','E','F','G','H','I','J','K','L','M',
                'N','O','P','Q','R','S','T','U','V','W','X','Y','Z',
                '.','-','_','(',')','+'
        };

// largest cube dimensions
        const uint8_t depth = 2;
        const uint8_t height = 50; // from/to value nvarchar size
        const uint8_t width = (sizeof(xAxis)/sizeof(*xAxis));
};

#endif /* DIMENSIONS_H_ */

/*
 *      Function Checks if passed value is numerical (letter)
 */
bool DigitalMatchingEngine::isNumerical(const int8_t val){return (val > 0 && val < 11);}
bool DigitalMatchingEngine::isLetter(const int8_t val){return (val >= 11 && val <= 36);}
```

FIG. 9

```
/*
 *      Digitalization function
 *      returns a "binary" cube with dimensions [RANGE_DEPTH MATRIX_HEIGHT INTERFACE_LENGTH]
 *      see .h file
 */
void DigitizationEngine::digitalize(string fromVal, string toVal, Cube &cube)
{
        // if there is no range, change the cube dimension to be a matrix
        if(toVal.empty() || fromVal.empty() || toVal == "" || fromVal == "" ||
          fromVal.size() == 0 || toVal.size() == 0){ cube.isInterval = false;}

// convert the from/to values to a binary representation
        for (uint8_t z = 0; z < DIM::depth; ++z)
        {
                if(z == 1 && cube.isInterval == false){ return; } string r;

// remove any leading and trailing whitespaces
                if(z == 0)
                {
                        r = trimWhitespaces(fromVal);
                }
                else if(z == 1)
                {
                        r = trimWhitespaces(toVal);
                }

// y axis = position of string
                // change to uppercase for processing and get the position of the letter
                for(uint8_t y=0; y<r.length(); ++y)
                {
                        cube.data[z][y][getPosition(DIM::xAxis, DIM::width, toupper(r[y]))] = 1;
                }
        }
}
```

FIG. 10

```
/*
 *      Function that converts the cube into a string
 *      if second param is true, convert cube back to initial string literal else to binary string
 */
string DigitizationEngine::convertCubeToString(Cube &cube, bool convertBack)
{
        string s;
        for(uint8_t z = 0; z < DIM::depth; ++z){
                if(z == 1){ s.append(1, '+'); }
                for (uint8_t y = 0; y < DIM::height; ++y){
                        for (uint8_t x = 0; x < DIM::width; ++x){
                                if(cube.data[z][y][x] == 1){
                                        if(convertBack){
                                                s.append(1, DIM::xAxis[x]);
                                        } else {
                                                s.append(1, '1');
                                        }
                                } else {
                                        if(!convertBack){
                                                s.append(1, '0');
                                        }
                                }
                        }
                }
        }
        return s;
}
```

FIG.11

```
/*
 *      Checks for 1:1 matches
 */
bool DigitalMatchingEngine::singleToSingle(Cube &matrixA, Cube &matrixB)
{
        for (uint8_t y = 0; y < DIM::height;)
        {
                matrixA.assignPositions(); matrixB.assignPositions();
                if(matrixA.from.curX == END || matrixB.from.curX == END){ return true; } if(matrixA.from.curX == matrixB.from.curX)
                {
                        matrixA.advance(); matrixB.advance(); ++y;
                }
                else if(matrixA.from.curX == STAR)
                {
                        if(matrixA.from.nextX == END){ return true; }
                        else { return matrixB.resolveWildcardIn(matrixA); }
                }
                else if(matrixB.from.curX == STAR)
                {
                        if(matrixB.from.nextX == END){ return true; }
                        else { return matrixA.resolveWildcardIn(matrixB); }
                }
                else { return false; }
        }
}
```

FIG. 12

```
/*
 *      Fastforward through a cube if it contains a wildcard that is not in the end of the string
 */
bool Cube::resolveWildcardIn(Cube &cube)
{
        bool matches = false;

while(from.curX != END)
        {
                //cout << "* Cube: "; logPosAsChar(cube.from.nextX, COL::RED);
                //cout << "  Cube: "; logPosAsChar(from.curX, COL::GREEN);
                if(cube.from.nextX == from.curX)
                {
                        if(!matches) matches = true;
                }
                else
                {
                        this->advance();
                        this->assignPositions();
                } if(matches)
                {
                        cube.advance();
                        cube.assignPositions();
                        if(cube.from.curX == STAR) return this->resolveWildcardIn(cube);
                }
        } return matches;
}
```

FIG.13

```
/*
 *      Compares a single value with a range
 */
bool DigitalMatchingEngine::singleToRange(Cube &matrixA, Cube &cubeB)
{
        for (uint8_t y = 0; y < DIM::height;)
        {
                matrixA.assignPositions(); cubeB.assignPositions();
                if(matrixA.from.curX == END || cubeB.from.curX == END){ return true; } if(matrixA.from.curX == STAR)
                {
                        if(matrixA.from.nextX == END){ return true; }
                        else { return cubeB.resolveWildcardIn(matrixA); }
                }
                else if(cubeB.from.curX == STAR)
                {
                        if(cubeB.from.nextX == END){ return true; }
                        else { matrixA.resolveWildcardIn(cubeB); }
                } else if(cubeB.to.curX == STAR && cubeB.to.nextX != END)
                {
                }
                else if(isNumerical(matrixA.from.curX))
                {
                        if(isNumerical(cubeB.from.curX) && isNumerical(cubeB.from.curX))
                        {
                                if(!isNumberRange(matrixA.toNumber(0), END, cubeB.toNumber(0),
cubeB.toNumber(1))){ return false; }

// Advance global iterator
                                y = (matrixA.from.it < cubeB.from.it) ? matrixA.from.it : cubeB.from.it;
                                y = (y > cubeB.to.it) ? y : cubeB.to.it;
                        }
                        else
                        {
                                return false;
                        }
                }
                else if(isLetter(matrixA.from.curX))
                {
                        if(isLetter(cubeB.from.curX) && isLetter(cubeB.to.curX))
                        {
                                if(!valInbetweenInclusive(matrixA.from.curX, cubeB.from.curX, cubeB.from.curX)){
return false; } else { return true; } matrixA.advance(); cubeB.advance(); ++y;
                        }
                        else
                        {
                                return false;
                        }
                }
                else if(matrixA.from.curX != cubeB.from.curX && matrixA.from.curX != cubeB.from.curX){ return
false; } else { ++y; }
        }
}
```

FIG. 14

| RULE FROM VALUE | RULE TO VALUE | AUTHORIZATION FROM VALUE | AUTHORIZATION TO VALUE | RESULT |
|---|---|---|---|---|
| "US01" | "*" | "*" | "*" | true |
| "US01" | "*" | "U*" | "*" | true |
| "SG01" | "*" | "P" | "*" | false |
| "U*" | "*" | "US01" | "*" | true |
| "F.*" | "*" | "F.27" | "*" | true |
| "F.27" | "*" | "F*" | "*" | true |
| "U*" | "*" | "U*" | "*" | true |
| "O3" | "*" | "US" | "*" | true |
| "U*" | "*" | "O3" | "*" | true |
| "U5" | "*" | "*" | "*" | true |
| "V*" | "X" | "A" | "*" | false |
| "Y" | "X" | "VA04" | "*" | false |
| "FICOBOT31" | "FICOBOT19" | "XK03" | "*" | true |
| "F1.1" | "F2.9" | "FICOBOT15" | "*" | false |
| "FK1" | "*" | "F5.*" | "*" | true |
| "F*.1" | "*" | "F*.1" | "*" | false |
| "VA01" | "VA10" | "VA09" | "*" | true |
| "VA09" | "VA12" | "VA01" | "*" | true |
| "VA" | "VD" | "VC" | "*" | true |
| "VC" | "VK" | "VA" | "*" | true |
| "B" | "E" | "A" | "*" | true |
| "O1" | "B" | "C" | "*" | false |
| "O1" | "*" | "O1" | "*" | true |
| "7_VB*" | "*" | "7_V810" | "VA12" | true |
| "7_VB10" | "*" | "7_V810" | "VA10" | true |
| "7_*B*0" | "*" | "7_V810" | "VX" | false |
| "7B*0" | "*" | "7B0" | "VO" | true |
| "7_VAAAAA10" | "*" | "7_V*B*0" | "D" | true |
| "7_B*0" | "*" | "7_V810" | "*" | true |
| "O1_DATA_COLLECTOR" | "*" | "*_DATA_COLLECTOR" | "*" | true |

FIG. 15

POSITIONALLY-ENCODED STRING REPRESENTATIONS, INCLUDING THEIR USE IN MACHINE LEARNING

CROSS REFERENCE TO RELATED APPLICATIONS

This is a continuation of, and incorporates by reference, U.S. patent application Ser. No. 15/594,086, filed May 12, 2017.

FIELD

The present disclosure generally relates to creating and manipulating positionally-encoded representations of character strings. Particular implementations relate to using binary matrix string representations in machine learning applications and in security applications.

BACKGROUND

A significant portion of data used by computer systems is in the form of character arrays or strings. While comparing two numerical values using a processor (e.g., a microprocessor of a computer device) is typically very fast, comparing two strings can be more time consuming, as potentially all characters in the smallest string would need to be evaluated before a mismatch could be determined. Thus, in the worst case scenario, string comparison has a linear time complexity based on the number of characters in the shortest string. In some cases, it may be desirable to determine the degree of overlap between two strings, in which case the time complexity will always be linear with respect to the number of characters in the shortest string. For very long strings, or when large numbers of strings are to be compared, significant processing resources, and time, can be required.

String comparison can be even more complex, and time and processor intensive, when one or more characters of a string are to be analyzed to determine whether they fall within a set or range of values. In some cases, both a source string a target string may have one or more characters that can fall within a set, or range, of values. In these cases, it may be necessary to sequentially test a character of the target string against possible values specified in the source string. Thus, in the worst case, for a particular character in the target string, multiple possible character values may need to be tested against every possible value of the source string.

Machine learning can be an efficient way to compare quantities, to categorize or classify input values, and to discover and utilize patterns and relationships in data. In many cases, the results provided by machine learning can be more accurate, and can be obtained in a shorter amount of time and with less processing power, than using more traditional methods. In some cases, traditional methods may be simply be unable to replicate machine learning. However, machine learning typically requires numerical input, and thus may be unsuitable for use with strings, given how strings are typically represented in computing languages (e.g., as sequences of characters).

Thus, there remains room for improvement in string comparison technology, and its application in fields such as security and authorization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating evaluation of strings, including comparing a plurality of strings, comparing a string with a rule, and evaluating a string using a machine learning algorithm. In a particular aspect, an authorization value is received that includes at least one character string. At least a portion of the character string is converted to a positionally-encoded representation. The converting includes, for each of a plurality of characters of the character string, comparing the character to an encoding schema. The encoding schema includes an array of a plurality of unique characters, such as the unique characters from which a string may be formed. The array has a length, and each unique character in the array has a unique position in the array.

A number of elements in a data structure are provided, the number being equal to the length of the array. The plurality of elements has an initial position, such as an initial position within an array. For a character being converted, a unique character in the array of unique characters is determined that is the same as the character of the character string. An index position of the unique character is determined. A position in the data structure is determined that is equal to the sum of the initial position and the index value. A value at the determined position of the data structure is set to indicate that the character of the character string is the determined unique character. Elements of the data structure that are not the unique character have a value that indicates that the unique character at the corresponding position in the array of unique characters is not the character of the character string. For example, characters present in the character string can have a value of one, or a first Boolean value, and characters not present in the character string can have a value of zero, or a second Boolean value. Or, the designations can be reversed (e.g., zero representing that a value is present in the character string).

The positionally-encoded string representation is compared with an authorization rule to determine whether the positionally-encoded string representation meets authorization criteria. Authorization is provided or denied based on results of the comparing.

According to another aspect, a positionally-encoded representation of at least a portion of a string is created, such as a positionally-encoded representation that includes binary or Boolean values indicating a character of the string. The string includes a plurality of characters. The positionally-encoded representation is created by encoding a data structure based on the positions of a plurality of characters of the at least a portion of the string in an encoding schema. The positionally-encoded string representation is provided as an input to a machine learning algorithm. The machine learning algorithm provides an output value, which is analyzed to determine whether the string is a member of a set.

In a further aspect, a method is provided that includes creating a positionally-encoded representation of an authorization token, where the positionally-encoded string representation can include digits or Boolean values. The authorization token includes at least one string. The positionally-encoded representation is created by encoding a data structure based on the positions of a plurality of characters of at least a portion of the string in an encoding schema. The positionally-encoded representation of the authorization token is compared with a positionally-encoded representation of an authorization rule. The authorization rule defines a set of authorized strings. It is determined if the positionally-encoded representation of the authorization token meets authorization criteria of the authorization rule. If the results of the comparing meet authorization criteria, an action, such as a restricted action, is permitted to be executed.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 9 is example C++ source code describing an encoding schema and methods for determining a character type of encoded data.

FIG. 10 is example C++ source code describing a method for converting a string to a positionally-encoded representation using an encoding schema.

FIG. 11 is example C++ source code describing a method for converting a positionally-encoded string representation to a one-dimensional binary representation of the string or a character representation of the string.

FIG. 12 is example C++ source code describing a method for comparing two positionally-encoded string representations.

FIG. 13 is example C++ source code describing a method for analyzing wildcard characters in a positionally-encoded string representation.

FIG. 14 is example C++ source code describing a method of comparing a discrete value of one positionally-encoded string representation to a range of values.

FIG. 15 is a table illustrating example comparison results from comparing values of an authorization object or token with an authorization rule.

DETAILED DESCRIPTION

Example 1

Overview

Figure 1:
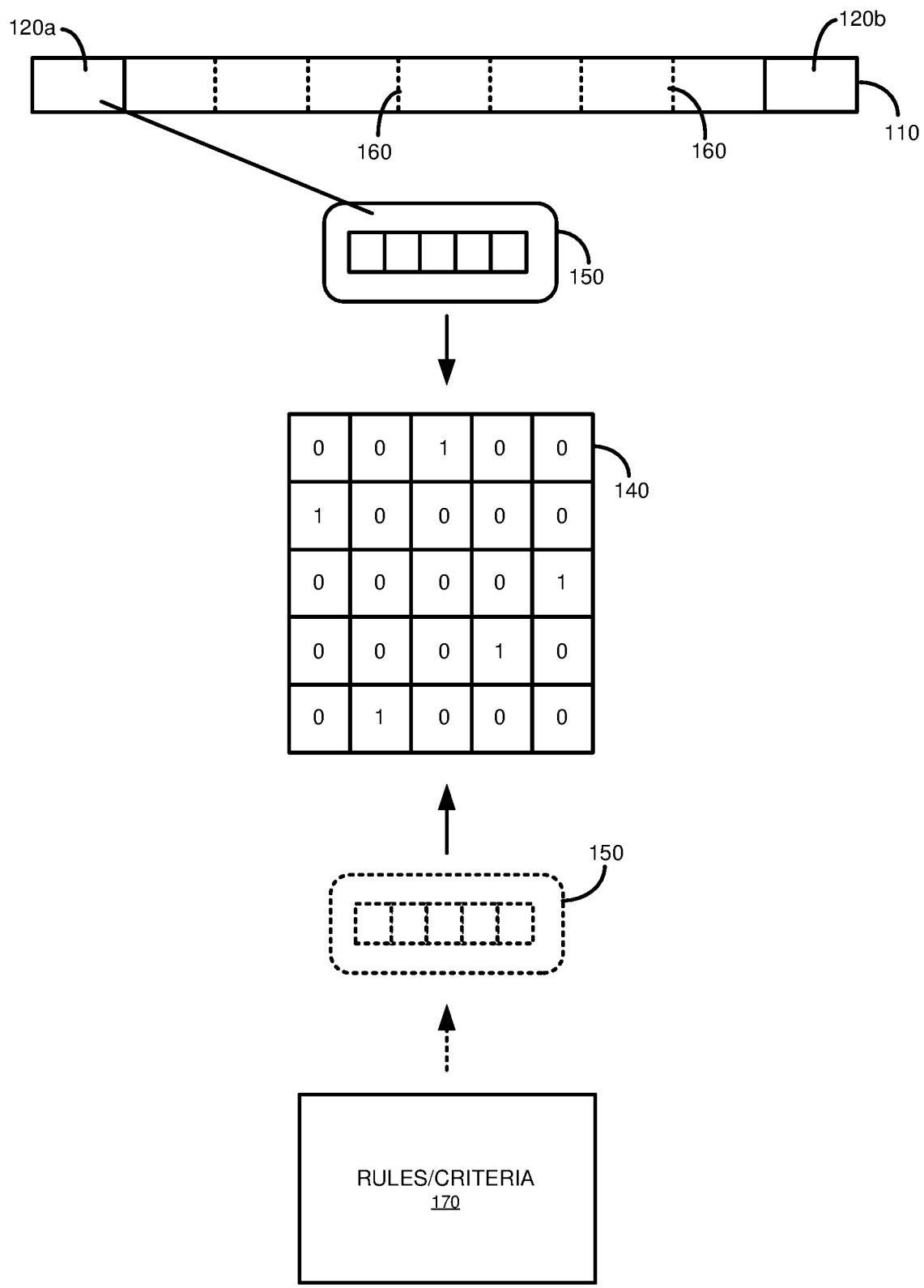
FIG. 1 is a diagram schematically depicting how an object, and optionally a rule or criteria, having at least one string can be positionally-encoded, such as by a binary matrix, using an encoding schema.

A significant portion of data used by computer systems is in the form of character arrays or strings. While comparing two numerical values using a processor (e.g., a microprocessor of a computer device) is typically very fast, comparing two strings can be more time consuming, as potentially all characters in the smallest string would need to be evaluated before a mismatch could be determined. Thus, in the worst case scenario, string comparison has a linear time complexity based on the number of characters in the shortest string. In some cases, it may be desirable to determine the degree of overlap between two strings, in which case the time complexity will typically be linear with respect to the number of characters in the shortest string. For very long strings, or when large numbers of strings are to be compared, significant processing resources, and time, can be required.

String comparison can be even more complex, and time and processor intensive, when one or more characters of a string are to be analyzed to determine whether they fall within a set or range of values. In some cases, both a source string a target string may have one or more characters that can fall within a set, or range, of values. In these cases, it may be necessary to sequentially test a character of the target string against possible values specified in the source string. Thus, in the worst case, for a particular character in the target string, multiple possible character values may need to be tested against every possible value of the source string.

As an example, strings can be used for security purposes, including evaluating access rights and action permissions. A particular employee may be associated with an access object, which can include many fields, each field having a range of possible string values. Access to a resource, or permission for an action, may be provided for a range of possible access objects, such as authorization tokens. When a user wants to access a resource or perform an action, one or more fields of their access object may be compared with a rule specifying possible acceptable values that will allow the access or action. It may also be of interest whether the permissions provided to a user (e.g., in an authorization object) may result in an undesired situation, such as the potential for fraud or a compliance issue. In this case, multiple permissions of the user may be analyzed using multiple rules, where each rule is associated with many possible string values. Carrying out these types of analyses using traditional string comparison techniques can be very time consuming. In many cases, because of analysis complexity and long processing times, the analysis is only performed after a problem has been discovered.

Machine learning can be an efficient way to compare quantities, to categorize or classify input values, and to discover and utilize patterns and relationships in data. In many cases, the results provided by machine learning can be more accurate, and can be obtained in a shorter amount of time and with less processing power, than using more traditional methods. In some cases, traditional methods may be simply be unable to replicate machine learning. However, machine learning typically requires numerical input, and thus may be unsuitable for use with strings, given how strings are typically represented in computing languages (e.g., as sequences of characters).

Thus, there remains room for improvement in string comparison technology, and its application in fields such as security and authorization.

The present disclosure provides an innovative mechanism for converting strings into a positionally-encoded representation. Specifically, an encoding schema can be used to convert the string into a matrix (including represented as an array), including as a matrix cube, or three-dimensional array, for a positionally-encoded representation of multiple strings or string portions. Various encoding schema can be used, such as depending on the character set used for the string. In some cases, an object to be evaluated can have multiple components that are to be evaluated. For instance, an authorization object can be used to describe access and action permissions for a user. The authorization object may be formed from many fields. A plurality of the fields may be analyzed in determining whether access to a particular resource or performance of an action is authorized. In such cases, at least a portion of each field, or statement, can be represented as a matrix. When a positionally-encoded representation of authorization object includes multiple matrices, the matrices can be stacked to form a cube.

Once a positionally-encoded representation of a string, or multiple strings, has been created, the positionally-encoded string representation can be subject to various types of analysis, including comparing the representation to other positionally-encoded string representations or a positionally-encoded representation of a rule. Generally, a positionally-encoded string representation can be analyzed to determine whether it is equivalent to, or a subset of, another positionally-encoded string representation, or meets rule criteria. For instance, an authorization object can be represented as a matrix or cube, and a rules object, specifying values that will result in an action or access being authorized, can be represented as a matrix or cube. The positionally-encoded representations of the authorization object and the rules object can be compared to determine whether access is authorized.

Being expressed as positionally-encoded representations, the matrix, cube, or collapsed (e.g., one-dimensional) representation of a string, or multiple string statements, can be used as input to a machine learning component. For instance, one or both of a positionally-encoded representation of an authorization object and a positionally-encoded representation of rules object can be provided to a machine learning component. In some cases, machine learning can be applied to compare the authorization object and the rules object. For instance, a machine learning component can determine if one, or multiple, string statements of each object match, or can determine a degree of matching.

Converting strings to positionally-encoded representations so that machine learning algorithms can be used for comparison purposes can greatly speed the comparison process, particularly when one or both of the objects include characters that can take multiple values. In addition to the more rapid comparison provided by using a positionally-encoded representation of a string, machine learning can uncover patterns such that fewer characters of the strings are be compared before a result can be determined. Thus, using machine learning, positionally-encoded representations of strings can allow characters to be compared more quickly, and can require fewer comparisons before a decision is reached.

As discussed above, the disclosed innovations can be used in checking authorization, as well as checking to see whether a particular authorization may give rise to risks (e.g., fraud, compliance violations). The faster processing provided by the disclosed innovations can enable real time access comparisons, including real-time risk assessment. For instance, while typical string comparison techniques for risk assessment can require hours or days to complete, the disclosed innovations can provide comparison results in seconds, or less, allowing for real-time authorization checking. Real-time authorization checking can prevent problems from occurring, rather than merely being used to discover the source of a problem that has already occurred.

The disclosed innovations can be applied in other contexts, such as comparing other types of security tokens that are formed from, or include, strings.

Example 2

Example Process for Creating Positionally-Encoded String Representation

FIG. 1 illustrates how an instance 110 of an object or datatype, having one or more strings 120 (e.g., a sequence of characters, such as letters, numbers, symbols, and combinations thereof that is not a numerical datatype) can be converted into a positionally-encoded representation 140 using an interface or encoding schema 150. Stings 120 are not limited to any particular datatype for a collection of characters. Strings 120 can be, for example, string literals, instances of a string class, null terminated character arrays (C-style strings), and the like. Rather than multiple discrete strings 120, the strings can represent a portion of a string, including multiple portions of a longer string.

Instance 110 is shown as including two strings 120, but can optionally include more strings (indicated by dashed lines 160) or fewer strings. The strings 120 can be of the same or different string types, and can be of the same or different lengths. In at least some cases, an instance 110 can include non-string elements. That is, for example, the instance 110 can be an abstract data type that includes at least one string 120 data member and one or more non-string data members. The data members can be maintained separately, or can be maintained as a continuous sequence of characters, with, for example, various sequence ranges being associated with particular data members and data types (e.g., characters 1-50 may be a string and characters 51-60 represent an integer value).

A positionally-encoded representation 140 of a string 120 can be a representation where each character of the string (or a portion of the string to be included in the representation) is represented by the position of the character in the encoding schema 150. The positionally-encoded representation can be a binary representation (e.g., using zeros and ones, or Boolean values), where the value at a position in the positionally-encoded representation 140 indicates that a corresponding character is, or can be, present in the string 120. The positionally-encoded representation can thus be a collection of n-tuples, where n is equal to the number of potential characters (or, the number of characters in the encoding schema 150, which, in some cases, may be less than all possible characters, such as if some characters are removed from the string 120 in forming the positionally-encoded representation). The number of elements in the collection can be equal to the number of characters in the string 120, or at least the number of characters that are to be included in the positionally-encoded representation 140. The possible values of the tuple elements are typically binary values, including Boolean values, which serve as status flags to indicate whether the particular character at the position in the tuple is, or can be, present in the string 120.

The positionally-encoded representation 140 can an intermediate string representation. The positionally-encoded representation 140 can be stored internally in a computer system in hardware, such as in memory or persistent storage.

The schema 150 can act as a blueprint of a conversion tool for converting a string 120 to the positionally-encoded representation 140. In particular aspects, the schema 150 is applied to each character of the string 120 that is to be converted to the positionally-encoded representation. The schema 150 can be used to interconvert an individual character of a string 120 (or a rule relating to strings) to a positionally encoded representation. The schema 150 can be represented as an n-tuple, where n is the number of possible characters in the string 120 (or that are recognized in the schema 150 and can be converted to the positionally-encoded representation 140). Each element of the n-tuple in the encoding schema 150 can be a unique character. To form the positionally-encoded representation 140, the element of the binary tuple corresponding to a string character having the same position as the position of the character in the n-tuple is set to have a value indicating the presence of the character (e.g., 1 or true). Positions of the binary n-tuple of the positionally-encoded representation 140 that cannot take a particular character value are set to a different value (e.g., 0 or false).

The encoding schema 150 can be an array having a length equal to a number of characters in a character set. For instance, the modern English alphabet includes 26 letters, each having an uppercase form and a lowercase form. In order to encode a string 120 formed from uppercase letters in the English alphabet, the array of the encoding schema 150 would include 26 elements or positions. However, the schema 150 is not limited to an alphabet, and can include letters, numbers, symbols, and combinations thereof. The schema 150 can use a recognized character set (e.g., the English alphabet, the alphabet of another language, a character set such as ASCII, Unicode, or the like), or can use a custom or arbitrarily constructed character set.

In the schema, the first letter of the alphabet is assigned to the first position in the array (e.g., element zero), the second letter of the alphabet is assigned to the second position, and so on. When a string 120 is to be encoded, each character in the string is associated with an array having the length of the encoding schema 150. The position in the array corresponding to the character is set to one, while all other positions in the array are set to 0. So for, example, for the string "DAB," applying the encoding schema 150 would produce the array (taking the first four positions of the array) of [0, 0, 0, 1, . . . ] for "D," [1, 0, 0, 0, . . . ] for "A", and [0, 1, 0, 0, . . . ] for "B." The combination of these arrays produces the positionally-encoded representation 140, a matrix having a number of rows equal to the length of the string 120 (either the actual length of the string, or the total possible length of the string) and a number of columns equal to the number of characters used in the encoding schema 150.

In cases where a string length is set (e.g., a program defines a string as having maximum length), and a string 120 has fewer actual characters in the set, the rows of the matrix 140 for which there are not actual string character values can be denoted by setting all of the row elements to zero (e.g., [0, 0, 0, 0, . . . ]), or a particular Boolean value (e.g., true). The matrix 140 can also be used to indicate where multiple string values are possible. For instance, for a "wildcard" character, all of the row elements for that character (or, in some cases, multiple characters), can be designated by setting all row elements to one (e.g., [1, 1, 1, 1, . . . ]). In the case of a wildcard that is to apply to a range of string characters, such as remaining string characters, all of the remaining rows in the matrix 140 can have all of their elements set to one. Taking "A*" as an example, the first row of the matrix 140 can be set to [1, 0, 0, 0, . . . ], with the remaining rows set to [1, 1, 1, 1, . . . ].

In addition to representing a single value, or all possible values, a row of the matrix 140 can be constructed to represent multiple discrete values. In a row, all possible or acceptable values for a character can be indicated by setting the corresponding elements to one, and setting all other elements to zero. For instance, for a string 120 where the first character can be 'B,' or 'C,' the second character must be 'A,' and the remaining characters can have any value, the matrix can be of the form:

[0, 1, 1, 0, . . . ]
[1, 0, 0, 0, . . . ]
[1, 1, 1, 1, . . . ]

Thus, the positionally-encoded, matrix, representation 140 can represent strings that would be difficult or impossible to represent using a character representation. Accordingly, rather than being formed from a particular string 120, a matrix representation can be constructed in another manner, such as being defined by a user or being constructed using particular rules or criteria 170, optionally using the encoding schema 150.

As explained above, in at least some cases, the disclosed innovations can facilitate comparing strings, or analyzing a string for compliance with a rule. The rule can be a rule 170, and can include wildcard values or may otherwise specify that a particular element of a string 120 can have multiple acceptable values. The string 120 can have a matrix representation 140 that includes a discrete value (e.g., a single element has a value of one) while the rule can have a matrix representation where one or more of the elements can have multiple values (e.g., multiple, and in some cases, all, elements in a row have a value of one).

In yet further cases, rather than comparing a string 120 to a rule 170, a matrix 140 can be produced that compares a rule with an object that can represent multiple strings. For instance, an authorization object for a user may specify a set of permissions possessed by the user, which can be specified as a range or set of string values. A rules object can specify a range, or set of string values, that are compliant with the rule. The authorization object and the rules object can each be represented by a matrix 140 where, in at least some cases, one or more rows of the matrix can have multiple values. The authorization object can be compared with the rules object to determine whether a set of values of the authorization object is a subset of the rules object. In other cases, the rules object can specify string values that are not authorized or compliant with a rule, and access or permission can be denied if the authorization object is a subset of the rules object (e.g., a blacklist versus a whitelist).

In at least some cases, permitting or denying access can be carried out in response to determining whether or not a positionally-encoded authorization object (such as an authorization object provided by a software application) matches a positionally-encoded representation of a rule (such as a rule provided by a software application); or, more generally, comparing two or more positionally-encoded strings. The results of comparing the positionally-encoded authorization object to a positionally-encoded representation of a rule (or, more generally, comparing two or more positionally-encoded strings) can be used to select between providing access (or authorization) or denying access (or authorization). The permitting or denying access, or authorization, can be carried out, for example, by a software application. The authorization object and authorization rule can be provided by a software application, and can be digital string representations (that in turn can be converted to positionally-encoded representations).

An instance 110 can have multiple strings 120, or a single string can have multiple string elements that are to be separately analyzed (e.g., a first set of characters is to be analyzed, a second set is not to be analyzed or encoded, and a third set of characters is to be analyzed). FIG. 1 illustrates the instance 120 has having a string 120a and a string 120b. While only string 120a is shown as encoded to produce the matrix 140, if desired, string 120b (or one or more other strings or string elements) can be encoded to produce a matrix. Multiple matrices for an instance 110 can be associated, such as in a cube (e.g., implemented in a three-dimensional array), and the cube used for comparison or analysis purposes.

A positionally-encoded representation 140 of a string 120, or string elements, can be described in one or more ways. For instance, a matrix can be collapsed to one-dimensional representation and, generally, a cube, or multi-dimensional representation of dimension n can be collapsed into a one-dimensional representation. In the example above for 'DAB,' the two-dimensional matrix can be collapsed by sequentially listing values according to the rows or columns of the matrix. Collapsing the example matrix by rows yields [0, 0, 0, 1, . . . 1, 0, 0, 0, . . . 0, 1, 0, 0, . . . ]. When collapsed, the matrix can represent a single numerical value, which can easily be compared with another numerical value of another positionally-encoded representation to determine whether the representations are the same and, optionally, the degree and nature of any differences.

Example 3

Example Cube Encoding Multiple Strings or String Elements

Figure 2:
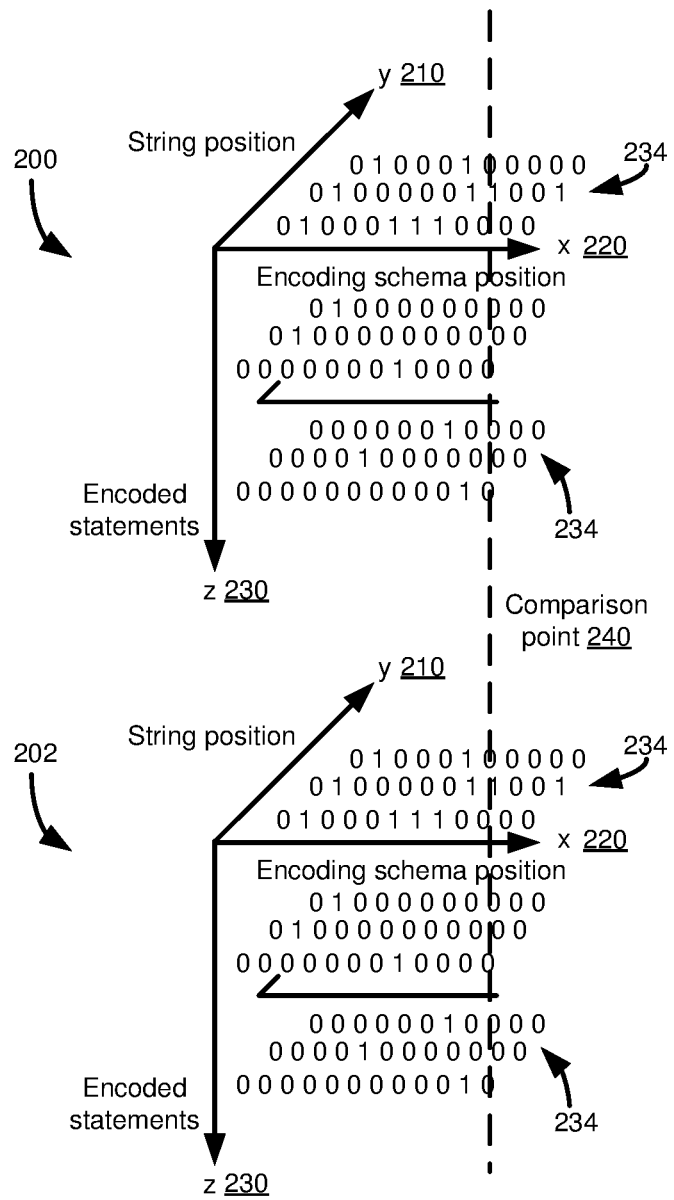
FIG. 2 is a diagram schematically depicting binary matrix cubes in which a plurality of strings, or string portions, can be positionally-encoded by applying an encoding schema.

As described in Example 2, multiple matrices, each for a string or string element, also referred to as statements, can be combined into a single positionally-encoded representation. FIG. 2 depicts cubes 200, 202, each having a y-axis 210 representing an index position in the array of characters from which the string is formed, a x-axis 220 representing the index positions in an encoding schema, and a z-axis 230 representing different encoded statements. That is, each plane (e.g., defined by the x and y axes), at a particular value, is a matrix 234, analogous to the matrix 140 of FIG. 1, for the particular statement of the z-axis value.

As when a positionally-encoded representation of a string, or string elements, is a matrix, a cube 200, 202 can also have its dimensionality reduced, including to a one-dimensional representation that can be analyzed as a single numerical value. A cube 200, 202 can be collapsed by rows, by columns, or by statement (by statement matrix 234, where the matrix is collapsed by row or by column), e.g.:

Collapse by rows: statement1Row1, statement2Row1, statement3Row1, statement1Row2 . . . .

Collapse by columns: statement1Column1, statement2Column1, statement3Column1, statement1Column2 . . . .

Collapse by statement/rows: statement1Row1, statement1Row2, statement1Row3, statement2Row1 . . . .

Collapse by statement/columns: statement1Column1, statement1Column2, statement1Column3, statement2Column1 . . . .

FIG. 2 also illustrates a comparison point 240. The comparison point 240 can be used to compare, or otherwise relate, elements at multiple layers of a single cube 202, 202 or one or more elements of a first cube with one or more elements of a second cube. Although shown as relating elements at the same position in each matrix 234 of each cube 200, 202, in other cases, a comparison point 240 can relate elements at different layers in different cubes, or can relate elements having different positions in the x-axis 220 or the y-axis 210 between different matrix layers. Also, although shown with cubes 200, 202, a comparison point 240 can be used with one or more positionally-encoded string representations that are not cubes (e.g., one or more of the positionally-encoded string representations can be a matrix, such as a matrix represented as a two-dimensional array), or can be used with one-dimensional, collapsed, representation.

The cubes 200, 202 can be used, in some cases two relate words in different languages. For instance, statement matrices 234, within the same cube 200, 202, or between different cubes, can be used to relate English and German versions of the same word or concept. In at least some examples, different classes of strings can be related using positionally-encoded string representations, provided that the same encoding schema is useable (e.g., the strings typically share the same character set).

Example 4

Example Process for Creating Matrix Cube Representing Multiple Strings

Figure 3:
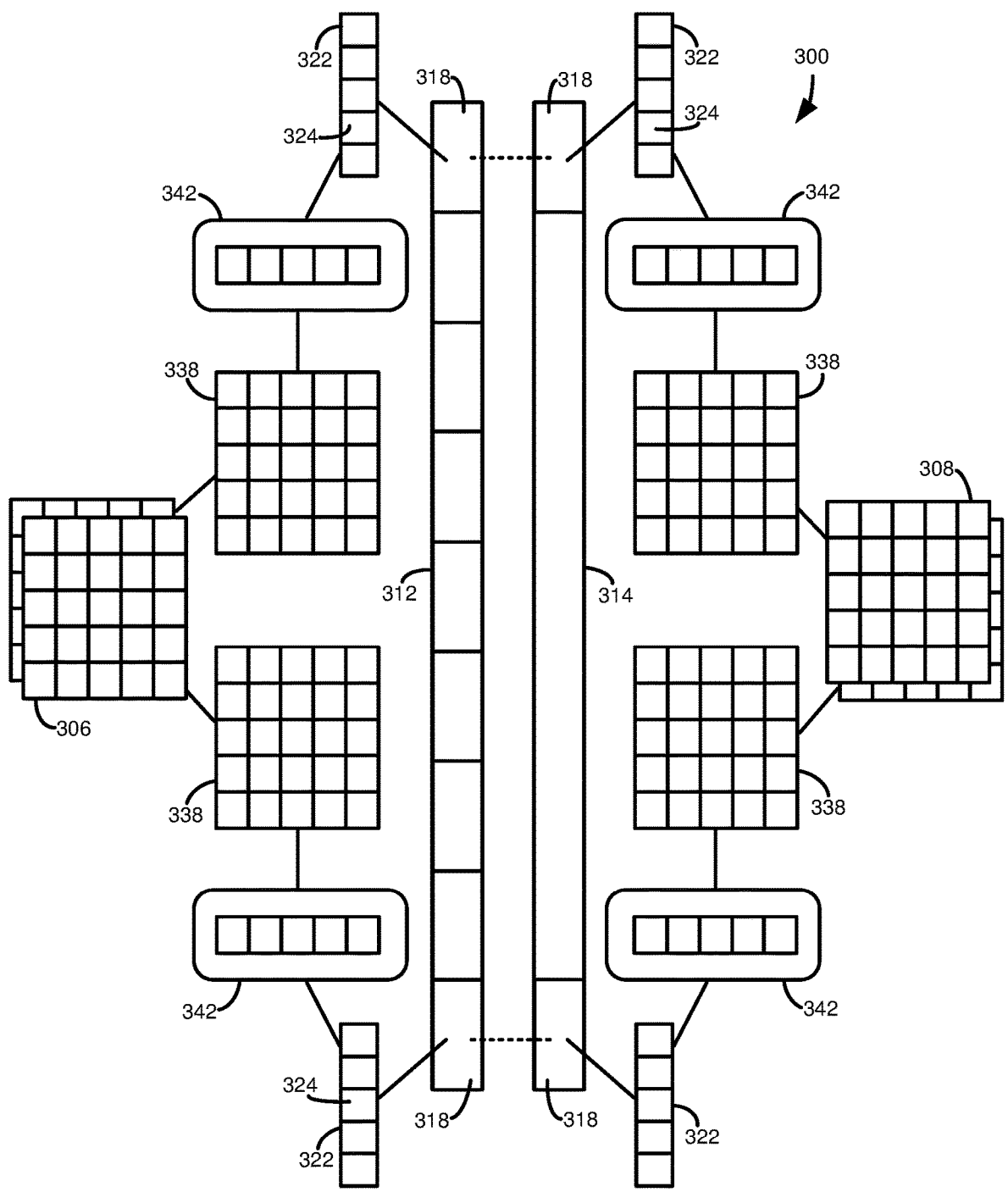
FIG. 3 is a diagram schematically depicting how an object and an authorization rule, each having a plurality of strings or string portions, can be represented as a matrix cube, or three-dimensional array, by applying an encoding schema.

FIG. 3 schematically depicts a process 300 for creating cube representations 306, 308 of a first object instance 312 and a second object instance 314, respectively, where the first and second object instances each have multiple strings or string elements 318. In the example shown, first and last strings or string elements 318 of the first and second objects instances 312, 314 are used to construct the cube representations 306, 308. For example, the second object instance 314 can represent a rule, where only the first and last string elements 318 of the first object instance 312 need be analyzed to determine whether authorization is present.

Each of the strings or string elements 318 can be represented as an array 322 of characters 324. The arrays 322 are converted to their matrix representations 338 using an encoding schema 342. The encoding schema 342 can be implemented as discussed above with respect to FIG. 1. The matrix representations 338 can be combined to form the cube representations 306, 308.

Example 5

Example Encoding Process

Figure 4:
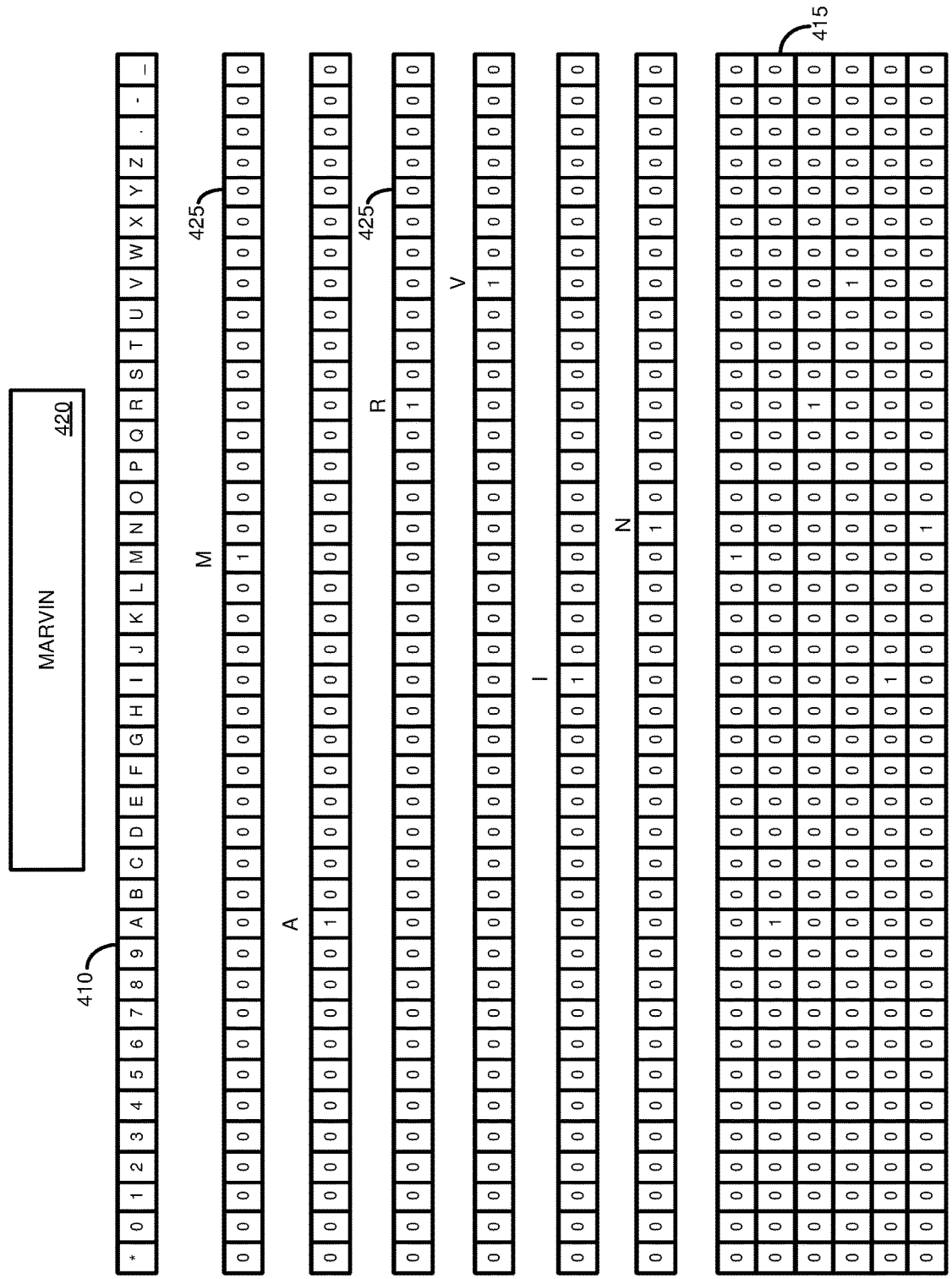
FIG. 4 is a diagram schematically depicting a process for converting a string to a binary matrix representation by applying an encoding schema.

FIG. 4 illustrates how an encoding schema 410 can be used to produce a matrix representation 415 of a string 420. The string 420, "MARVIN," has six characters. Thus, six rows will be needed in the matrix representation 415. However, in some cases a matrix representation 415 can include a larger number of rows than required for the actual number of characters in a string, such as when a string is defined to have a fixed size/number of elements, regardless of the number of actual (e.g., meaningful) characters or elements in a particular string.

The encoding schema 410 is shown as an array, where each element in the array is associated with a particular, unique, character. The characters in the array can be numbers, letters, or symbols. Each character in the string 420 to be encoded can be represented by an array 425, having a number of elements equal to the number of elements in the encoding schema. The identity of a character at a particular position of the string 420 can be indicated by setting the value of the element having a position corresponding to the position of the character in the encoding schema 410 to one (or, setting all non-present characters to one and setting present characters to zero), setting all present characters to true and all non-present characters to false, setting all present characters to false and all present characters to true, or the like.

Each array 425 can be included, sequentially, in the matrix representation 415. If desired, the matrix representation 415 can be re-converted to the string 420, which can be a compressed representation of the string compared with the matrix representation 415. Re-conversion can simply involve forming the string 420 by adding a character to an array of characters, where the character is determined as the character of the encoding schema 410 associated with the index position of the element of the array 425 having the value of one.

Example 6

Example Comparison of Positionally-Encoded String Representations

Figure 5:
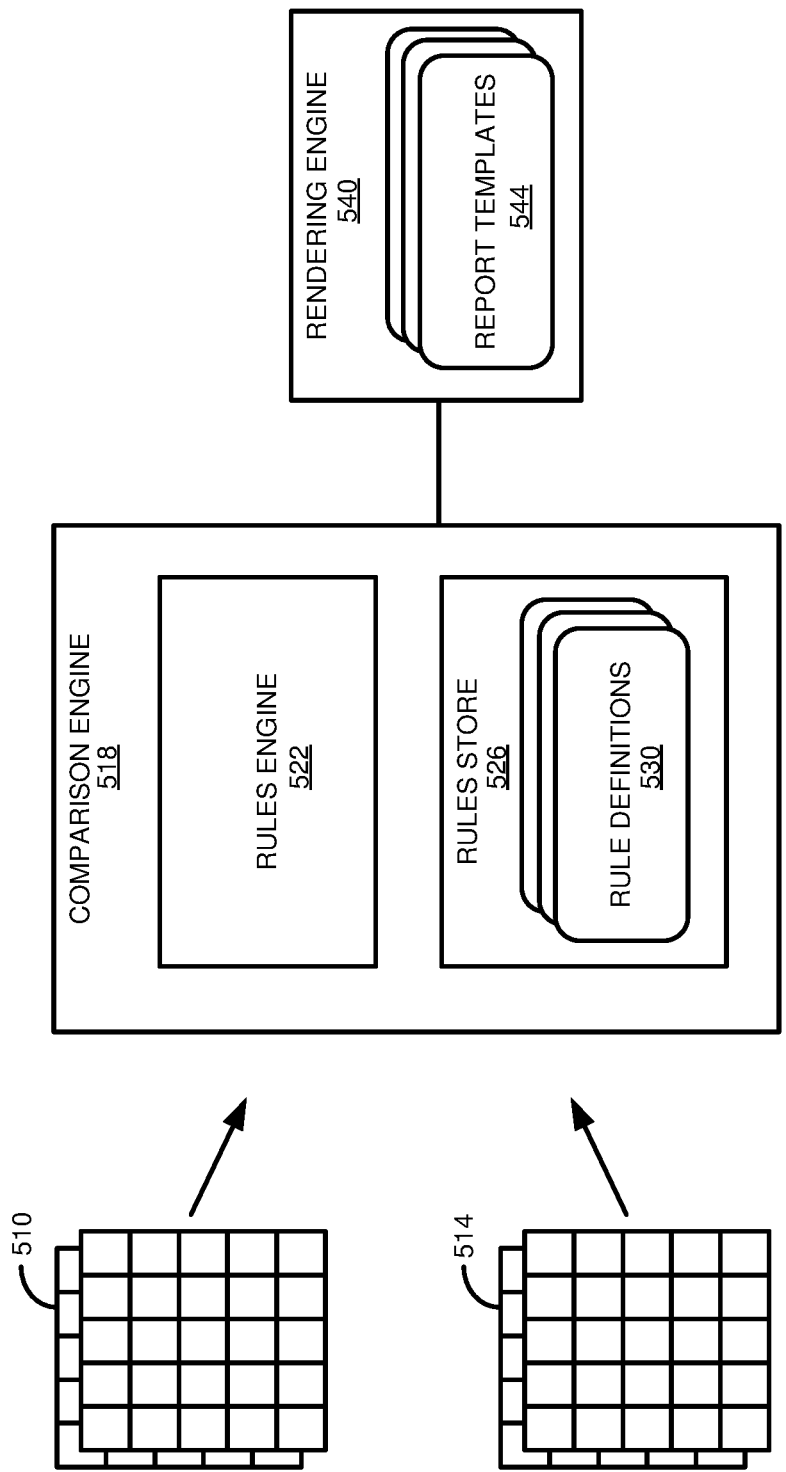
FIG. 5 is diagram schematically depicting a process for comparing two positionally-encoded string representations using a comparison engine.

FIG. 5 schematically depicts how two positionally-encoded string representations 510, 514 can be compared using a comparison engine 518. The positionally-encoded string representations 510, 514 are shown as cubes, or three dimensional, matrices. However, the positionally-encoded string representations 510, 514 can have other forms, such as a two-dimensional matrix or a collapsed matrix representation (e.g., a one-dimensional representation of a multi-dimensional matrix or array), and can represent a larger or smaller number of string statements.

The comparison engine 518 can include comparison logic for conducting a comparison of the positionally-encoded string representations 510, 514, or selected portions thereof. For instance, particular values or ranges of the positionally-encoded string representations 510, 514 can be selected for comparison. In at least some cases, the portions selected for comparison need not be the same between the positionally-encoded string representations 510, 514. For instance, a two-dimensional array at a first z-axis value of positionally-encoded string representation 510 can be compared with the two-dimensional array at a second z-axis value of the positionally-encoded string representation 514. For a particular two-dimensional array, a single value, multiple discrete values, a range (such as a contiguous range) of values, or multiple ranges of values can be specified for comparison. In at least some cases, when multiple elements of a positionally-encoded string representation 510 are selected for comparison, the same number, and, in at least some cases, arrangement, of elements is selected in the positionally-encoded string representation 514, even if the positions of the elements differs between the positionally-encoded string representations. In other cases, the number of elements, or arrangement, of elements being compared can differ between the positionally-encoded string representations 510, 514, and logic of the comparison engine 518 can resolve any differences in the number of elements being compared, or their arrangement.

The comparison engine 518 can include a rules engine 522. While the comparison engine 518 can determine the value of elements of the positionally-encoded string representations 510, 514 to be compared, the rules engine 522 can determine a relation of the values, such as whether the values match, whether a value is greater or less than another value, or whether a value is within, or a subset of, another value (e.g., a set).

The rules engine 522 can communicate with a rules store 526 that includes rule definitions 530. The rule definitions 530 can specify rules that determine if single elements match, can specify rules that determine whether particular subsections of the positionally-encoded string representations 510, 514 match, or whether the positionally-encoded string representations, overall, match. In at least some cases, the rules store 526 can include multiple rule definitions 530, and one or more particular rule definitions can be selected for a particular comparison (e.g., an application or user can specify one or more rules to be applied). Rule definitions 530 can be, for example:

is an element of positionally-encoded string representation 510 the same as an element of positionally-encoded string representation 514?

is an element of positionally-encoded string representation 510 within a range of elements positionally-encoded string representation 514, including the endpoints?

is an element of positionally-encoded string representation 510 within a range of elements of positionally-encoded string representation 514, excluding the endpoints?

is a range of elements of positionally-encoded string representation 510 equal to, or a subset of, a range of elements of positionally-encoded string representation 514?

Rule definitions 530, or logic of the comparison engine 518, can also include logic for handling wildcard operations or cases where an element of a positionally-encoded string representation 510, 514 can include multiple values.

The comparison engine 518 can be in communication with a rendering engine 540. The rendering engine 540 can include one or more report templates 544. Comparison results from the comparison engine 518 can be formatted into a report using a report template, and the report rendered for output, such as to a display or printer.

In a specific example, the positionally-encoded string representations 510, 514 can represent an authorization object and an authorization rule. An authorization object, or an authorization rule, can be defined in terms of an authorization interval. An authorization interval can be used to describe permissions possessed by a user (or another entity, such as a software application or computer system), or an authorization rule that defines what authorization objects are authorized (or are not authorized). An authorization interval can be a range, which can be a range that is bounded on one end (e.g., has a starting value but not an ending value, or has an ending value but not a starting value), or can be bounded at both ends by a starting (or "from") value and an ending (or "to") value. Values can be open ended, such as by using a wildcard symbol (e.g., '*').

When an authorization object is compared with an authorization rule, a single value of an authorization object can be compared with a single value of an authorization rule, one of the authorization object and authorization rule may have a range and the other a single value, or both the authorization object and the authorization rule may be specified in terms of ranges. A comparison of the authorization object and authorization rule may determine whether two single values match, whether a single value is within a range, or whether two ranges overlap. When a range is used, a comparison rule can specify whether or not the range endpoints count as a match.

As an example of ranges, a range may be specified as A* to Z* (which can be referred to as a pattern), which will match any string that begins with an uppercase letter (assuming case sensitivity). A range may be specified as A*, in which the range is strings that begin within an uppercase A. A range may be specified as AB01 to AL20 (which can be referred to as a character group), which is the range of strings that have the first character of A, a second character between B and L, and a number between 1 and 20. In other aspects, ranges may be specified in different ways, an authorization object or rule is not specified as an authorization interval, or the innovations are applied to areas other than authorization objects and rule.

Example 7

Example Machine Learning Analysis of Positionally-Encoded String Representation

Figure 6:
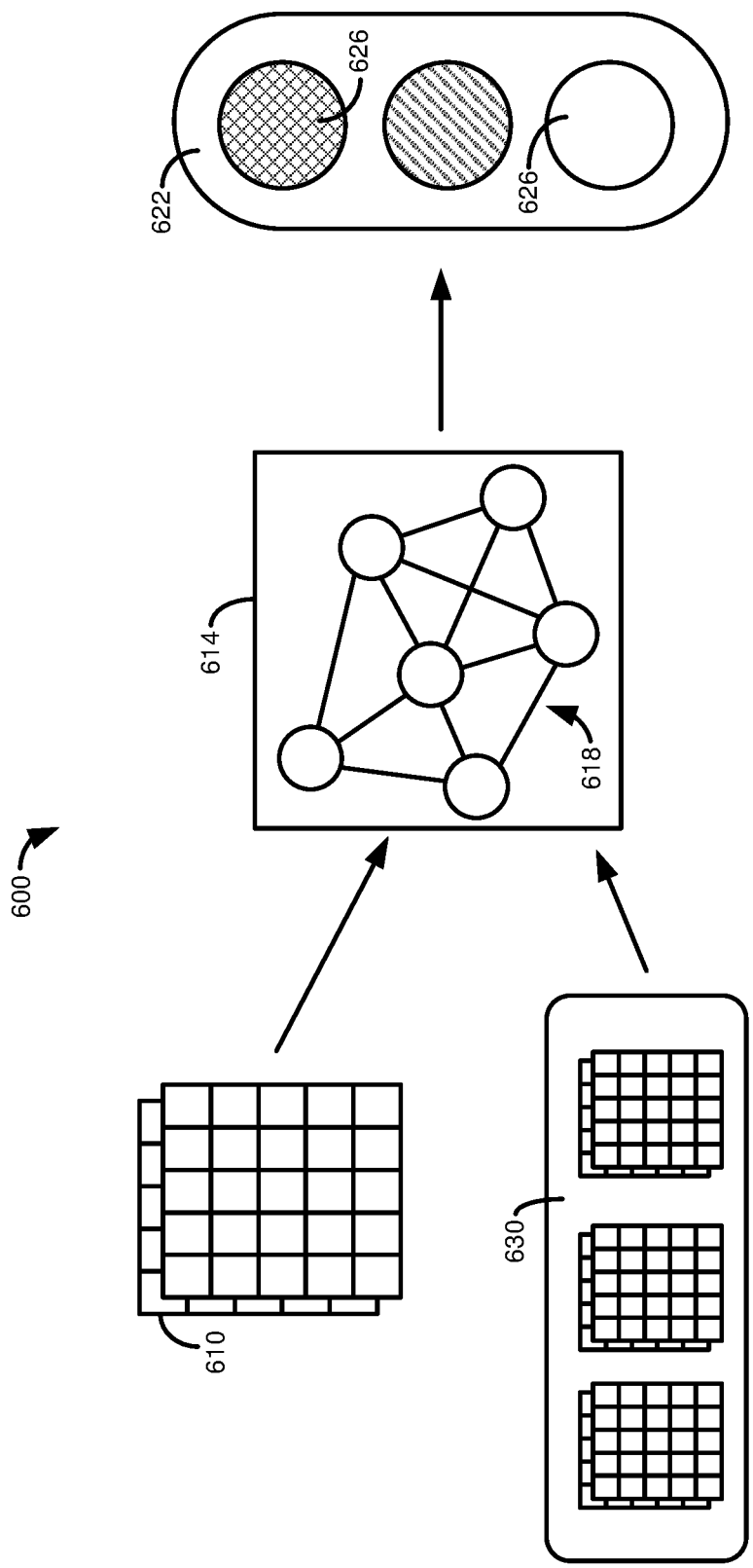
FIG. 6 is a diagram schematically depicting a process for analyzing a positionally-encoded string representation with a machine learning algorithm.

A key benefit of the disclosed innovations is that strings can be converted to a numeric representation that can be an input to a machine learning algorithm. Typically, machine learning algorithms are unable to use strings as input. FIG. 6 illustrates a process 600 for analyzing a positionally-encoded representation of a string 610 using a machine learning component 614 applying an algorithm 618. The output 622 of the machine learning component 614 can be a classification of the input positionally-encoded string representation 610, such as into one or more categories 626. The output 622 can be, for example, a yes/no (true/false) determination, or a classification into a category 626.

The output 622 can represent different aspects of the input positionally-encoded string representation 610, such as depending on the nature or meaning of the input positionally-encoded string representation 610 and the algorithm 618 (including any training provided to the algorithm). In the case of a positionally-encoded string representation 610 of an authorization, the categories 626 can represent access to a resource, or authorization for an action, being authorized or not authorized. Or, the categories 626 can represent a risk level associated with providing access to a resource, or permitting an action to be executed, such as low, medium, or high risk. In other cases, rather than categories 626, the machine learning component 614 can provide a different type of output 622, such as a numeral value that can be associated with an aspect of the input 610, such as a numerical value that is associated with a risk level.

The machine learning component 614 can accept multiple inputs, including the input 610 and one or more additional inputs 630. The additional inputs 630 may be positionally-encoded representations of other strings or objects that are to be compared with the input 610, or can represent rules that are used to evaluate the input. The machine learning component 614 can be used, for example, to compare the input 610 with one or more of the additional inputs 630. In a specific example, the input 610 is an authorization object and an additional input 630 is a definition for authorization objects that are allowed (or not allowed) to access a resource or perform an action. In another example, the input 610 is an identifier for an entity (e.g., a person or an object, such as a product, piece of machinery, or information) and the additional input 630 is a rule that specifies what entities should, or should not be provided to another entity (for instance, determining whether a piece of machinery should be sold to a company located in a country that may be subject to sanctions). In other cases, rather than determining whether authorization is present, the additional inputs 630 can be used to determine a level of risk for enabling access to a resource or allowing an action.

Example 8

Example Software Architecture

Figure 7:
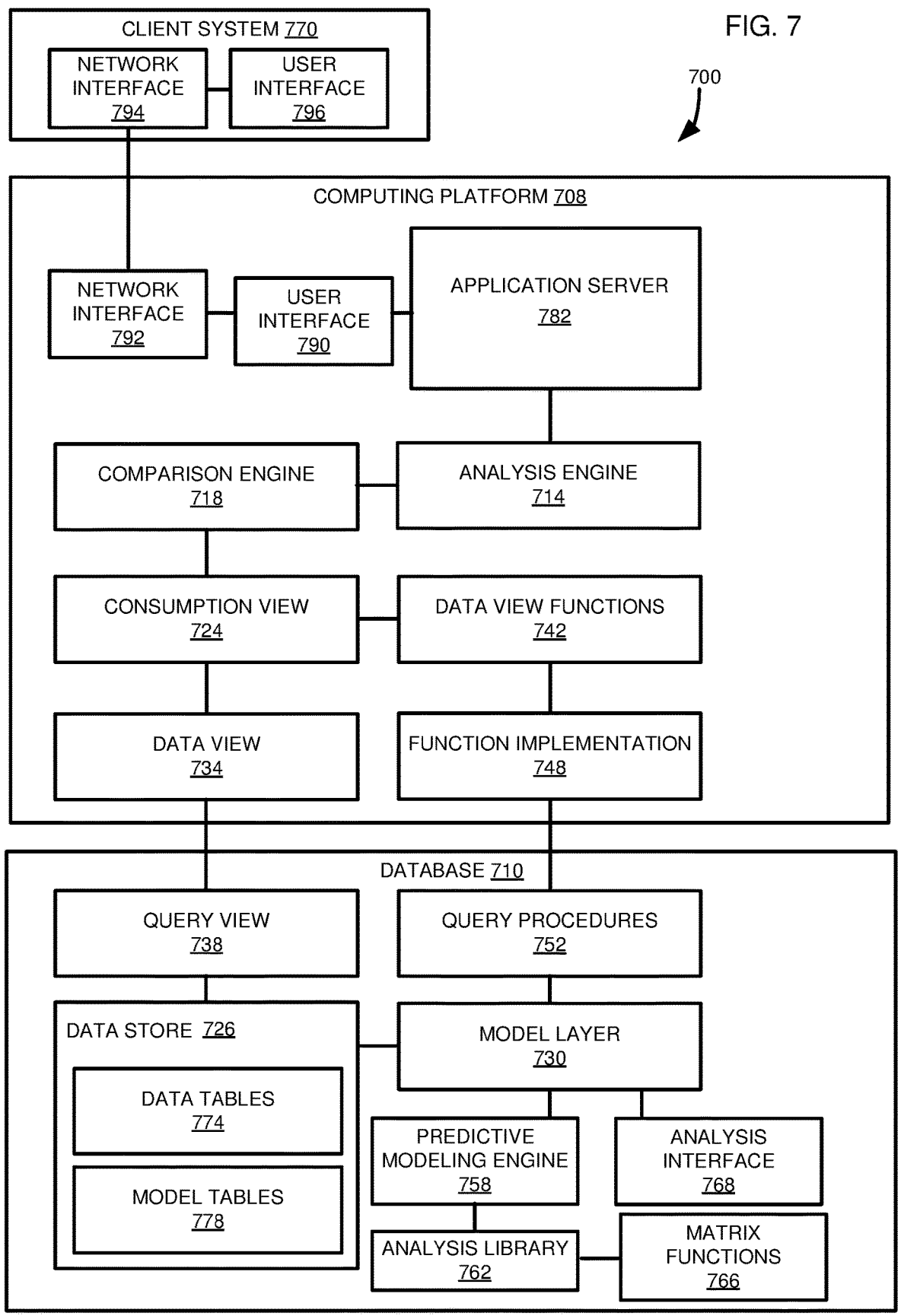
FIG. 7 is an example system architecture for a computing system in which at least certain disclosed innovations can be implemented.

FIG. 7 is a block diagram providing an example software architecture 700 that can be used in implementing at least certain embodiments of the present disclosure. The architecture 700 includes a computing platform 708 and a database 710. In specific examples, the computing platform 708 can be the S/4 HANA platform, and the database 710 can be the HANA database system, both of SAP SE of Walldorf, Germany.

The computing platform 708 can include an analysis engine 714. The analysis engine 714 can analyze one or more strings or object instances having at least one string component. For instance, the analysis engine 714 can analyze a string component to determine whether access to a particular resource, or taking a particular action, is authorized, or to determine a level of risk associated with the string component, such as a level of risk in authorizing access to a particular resource or to take a particular action.

The analysis engine 714 can communication with a comparison engine 718 which can be, for example, the comparison engine 518 of FIG. 5. The comparison engine 718 can access a rules framework 722, which can be the rules engine 522 of FIG. 5.

The comparison engine 718 can also be in communication with a consumption view 724 that can be generated using data stored in a data store 726 of the database 710 and the results of analyzing a model associated with an analysis procedure of the analysis engine 714. The model can be maintained and defined in a model layer 730 of the database 710. The consumption view 724 can represent a compilation of data and, optionally, transformation of the data into a format that can be read and manipulated by the analysis engine 714 and other components of the architecture 700. In particular implementations, the consumption view 724 provides an interface for requests, such as requests using the ODATA protocol, from the analysis engine 714, including requests originating at other components of the architecture 700. In a specific example, the consumption view 724 can be a CORE DATA SERVICES CONSUMPTION VIEW provided by the HANA database system and S/4 HANA platform of SAP SE of Walldorf, Germany.

The consumption view 724 can be generated in part from a data view 734, such as a CORE DATA SERVICES VIEW provided by the HANA database system and S/4 HANA platform of SAP SE of Walldorf, Del. The data view 734 can be a design-time object that aggregates, formats, or otherwise manipulates or presents data from one or more data sources. For example, the data view 734 can be constructed from one or more query views 738 provided by the database 710. For example, a query view 738 may represent a table, such as virtual table, generated from the response to a query request processed by the database 710, such as using structured query language (SQL) statements to retrieve data from the data store 726. In a specific example, the query view 738 can be a SQL VIEW provided by the SAP HANA database system, in particular the SAP HANA EXTENDED APPLICATION SERVICES, of SAP SE of Walldorf, Germany.

The consumption view 724 can also include data provided by predictive analytics (including machine learning algorithms) associated with an analysis being executed or managed by the analysis engine 714. In a particular example, the consumption view 724 can include or be associated with functions that define data to be included in the consumption view. The functions can be maintained by a data view functions component 742 which, in particular examples, can be a CDS TABLE FUNCTION of the S/4 HANA platform of SAP SE of Walldorf, Del. The data view function component 742 can, for example, allow structured query language functions to be included in the consumption view 724.

A particular function of the data view function component 742 can be associated with an object implementing the function associated with, or stored in, a function implementation component 748. In a particular example, the functions can be implemented in the ABAP programming language, such as an ABAP managed database procedure that can be used to manage or call stored procedures maintained in the database 710. More particularly, the function implementation 748 can be in communication with, and call or manage procedures stored in, a query procedures store 752 of the database 710.

At least a portion of the query procedures of the query procedure store 752 can interact with the model layer 730. For example, procedures of the query procedure store 752 can retrieve, and optionally manipulate, data associated with a model maintained by the model layer 730. In at least some cases, other components of the computing platform 708 can interact with the model layer 730, such to create, edit, manage, or delete models. In other cases, another components of the architecture 700 (including components not specifically illustrated in FIG. 7) can interact with the model layer 730 to carry out such actions.

In at least some cases, the model layer 730 can provide a framework for creating and manipulating models within the architecture 700, including models that can be used for predictive modeling, or models that can be used for other purposes. In a particular implementation, the model layer 730 is, or includes, the UMML4HANA or PREDICTIVE ANALYSIS INTEGRATION frameworks of SAP SE of Walldorf, Germany. In some cases, a single model may be used to model one or more aspects of a particular analysis of the analysis engine 714 (e.g., to determine whether two or more strings match, if a string complies with a rule, or string analytics). In other cases, multiple models can be used for a single analysis. For instance, different models may be associated with different steps of the analysis.

The model layer 730 can communicate with a predictive modeling engine 758 to carry out analyses associated with a model. In some cases, the predictive modeling engine 758 can execute analysis procedures stored in an analysis library 762. In particular examples, the analysis library can be the AUTOMATED PREDICTIVE LIBRARY, the PREDICTIVE ANALYSIS LIBRARY, or the APPLICATION FUNCTION LIBRARY of SAP SE of Walldorf, Germany.

Non-limiting examples of predictive analysis techniques that can be used by the predictive modeling engine 758 include clustering, classification, regression, association, time series, preprocessing, statistics, social network analysis, and combinations thereof. In particular cases, the predictive analysis can include a machine learning component. Suitable machine learning techniques can include decision trees, artificial neural networks, instance-based learning, Bayesian methods, reinforcement learning, inductive logic programming, genetic algorithms, support vector machines, or combinations thereof.

In at least some cases, the predictive modeling engine 758 can apply multiple analysis techniques to a particular model. The analysis technique, or techniques to be used, can, in some aspects, be directly specified, such as by a user when constructing a model. In other aspects the predictive modeling engine 758 can determine which analysis technique should be used, or can analyze the model with multiple techniques. In a specific example, the predictive modeling engine 758 can apply an algorithm, such as structured risk minimization, to determine one or more analysis techniques that provide useful information.

The analysis library 762 can include, or can be in communication with, matrix functions 766. Matrix functions 766 include functions for creating positionally-encoded representations of strings, for converting positionally-encoded string representations back to string form, and for comparing positionally-encoded string representations. In at least some implementations, the matrix functions 766, and/or the analysis library 762, can be accessed without accessing the predictive modeling engine 758. For instance, the analysis library 762 or matrix functions 766 can be accessed by query procedures 752 and or the model layer 730.

The model layer 730 can optionally be in communication with an analysis interface 768. In some implementations, the analysis interface 768 can allow for creation or manipulation of models of the model layer 730. For example, the analysis interface 768 can be in communication with a client system 770. In further implementations, the analysis interface 768 can provide access to additional analysis tools or components. For instance, the analysis interface 768 can use machine learning capabilities provided by AMAZON WEB SERVICES (Seattle, Wash.), GOOGLE CLOUD PLATFORM (Google Inc., Mountain View, Calif.), MICROSOFT COGNITIVE SERVICES (Microsoft Corp, Redmond, Wash.), HPE HAVEN ON DEMAND (Hewlett Packard Enterprise Development LP, Palo Alto, Calif.), and IBM WATSON SERVICES ON BLUEMIX (IBM Corp., Armonk, N.Y.).

The data store 726 of the database 710 can include data, such as data used in a process associated with the analysis engine 714. For example, the data can be stored in data tables 774. The data store 726 can also include data to be used by the model layer 730. In some cases, the model layer 730 can directly access data in the data tables 774. In other cases, the database 710 can maintain data associated with the model layer 730 in model tables 778.

Returning to the computing platform 708, the analysis engine 714 can be in communication with an application server 782 or similar component for providing access to the analysis engine 714 to a user or external applications. The application server 782 can include specific components to execute functionality associated with the analysis engine 714. The application server 782 can be in communication with a user interface component 790 that can send information to, and receive information from, the client system 770, such as through a network interface 792. The user interface 790 can process commands for execution by the application server 782, or format information for consumption by the client system 770.

The client system 770 can include a network interface 794 for communicating with other components of the architecture 700, including the computing platform 708. Although not shown, in some embodiments, the client system 770 can directly communicate with the database 710. The network interface 794 can communicate with a user interface 796. The user interface 796 can be used to display information to a user and to receive user commands in interacting with an analysis managed by the analysis engine 714.

The architecture 700 can include more or fewer components than shown, and may be organized in other manners. For example, functionality of a particular component can be carried out by another component. In addition, in at least some cases, functionality can be carried out using multiple components. In a specific example, the functionality of two or more of the client system 770, the computing platform 708, and the database 710 can be combined in a single system.

Example 9

Example Rules Framework for Positionally-Encoded String Representations

Figure 8:
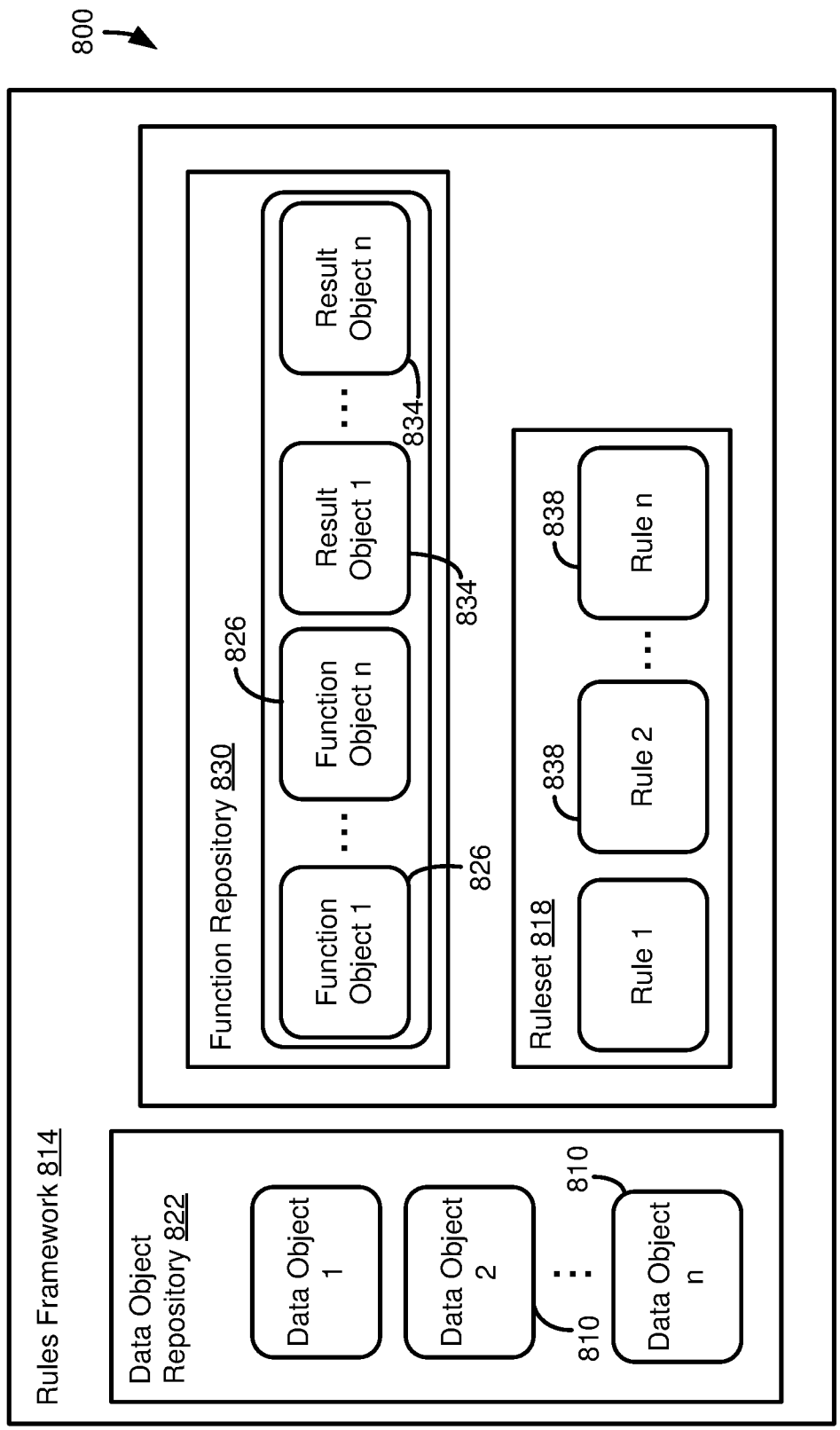
FIG. 8 is a diagram schematically depicting how, in a rules framework, a plurality of data objects and a plurality of data functions can be processed according to a plurality of rules of a rule set.

FIG. 8 schematically depicts a system 800 illustrating how a collection of logical data objects 810 can interact with a rules framework 814 (e.g., a rules framework in communication with the comparison engine 714 of FIG. 7, which can be in communication with a rules engine, such as the rules engine 522 of FIG. 5) to create a rule set 818 that can be used by an analysis engine, such as the analysis engine 714, including to provide a determination of whether an access request or action is authorized, or to determine a level of risk, such as a risk level associated with an access request or action (which can also be used to determine whether to allow the access or action).

The logical data objects 810 can be maintained in a repository 822. In some examples, the repository 822 can be a database, such as the database 710. In other examples, the repository 822 can be maintained in a different manner, including being maintained by another component of the architecture 700, such as a repository maintained in the computing platform 708.

The logical data objects 810 can represent or contain information related to various components, such as tasks, decision, or data items (e.g., individual data elements, or collections of data elements, such as information related to a particular individual or a particular account) which can be analyzed, such as using the analysis engine 714. In particular examples, the logical data objects 810 can be authorization objects, representing permissions for a particular user, for example, or can be rule objects, useable to determine what permissions are needed to access a particular resource or carry out a particular action. The logical data objects 810 can serve as input to one or more function objects 826 of a function repository 830. The function objects 826 can perform processing on one or more logical data objects 810, or other information, serving as input for the function object. In at least some cases, a function object 826 can return a result object 834 that includes an outcome of rule processing (e.g., whether authorization exists, whether access or an action should be permitted, a risk level, etc.). The logical data objects 810, function objects 826, and, optionally, results objects 834, can form a model, or model specification, for a particular analysis.

The function objects 830 can be associated with one or more rules 838 of the ruleset 818. The rules 838 can define actions to be taken in response to a particular function object 826, such as based on values associated with, or produced by, the function object. The rules 838 can specify actions to be taken, as well as the conditions under which the rule should be applied. A rule 838 can be, for example, can be a definition of when two positionally-encoded string representations are equivalent or meet other criteria. Although not shown in FIG. 8, in at least some cases, the rules 838 can access additional data for use in carrying out the rule. The rules 838 can also return information to be incorporated in the result objects 834.

The system 800 can allow for decoupling of the logical data objects 810, function objects 826, and rules 838, which can facilitate creating and modifying an analysis, or the ruleset 818 used in executing, evaluating, or monitoring the analysis. In addition, the system 800 illustrates how an analysis, such as an analysis defined using the logical data objects 810, function objects 826, and result objects 834, can be decoupled from the basis of the ruleset 818.

Example 10

Example Source Code Implementing Encoding Schema

FIG. 9 illustrates example source code (in C++) that defines an encoding schema or interface, and sets dimensions for a positionally-encoded representation of an object that includes at least one string. In this case, the object includes at most two strings that are to be positionally-encoded, and so the positionally-encoded representation is a matrix cube, or three-dimensional array, having a maximum depth of two. The height of each matrix in the cube is limited to 50 characters, and the width is equal to the number of characters or elements in the encoding schema.

FIG. 9 also illustrates function prototypes for determining whether a particular element of a cube is a letter or a number, as comparisons may be carried out differently depending on the nature of the element. Although not shown, other functions can be included to determine the nature of an element, such as to determine the case of a letter or to determine whether an element is a symbol, or other type of non-letter/non-numerical element.

Example 11

Example Source Code for Creating Positionally-Encoded String Representation and for Reforming Character String Representation FIG. 10 illustrates an example function, digitalize, that converts one or more strings, provided in the "from" and "to" parameters, to a matrix cube (e.g., two-dimensional matrix, which can be represented as a three-dimensional array) representation. If one of the "from" and "to" parameters is not provided, the cube representation is changed to a matrix representation (e.g., the cube has a depth of one).

The function iterates through the string, each iteration representing a y-axis position of the cube (e.g., character or element or the string) corresponding to a string element, and determines the proper encoding for the array corresponding to the x-axis. Specifically, the element at the x-index corresponding to the encoded value of the string is set to one, all elements of the array having been initialized to zero. Note that the function converts any lowercase letters to uppercase to determine the x-axis encoding (e.g., case information may be lost in the encoding process).

FIG. 11 illustrates an example function, convertCubeTo-String, that takes a cube (or two-dimensional matrix) representation of a cube and returns the corresponding string (e.g., character representation). The function includes a parameter, convertBack, that can be used to determine whether the function returns the character version of the string (if true), or the collapsed (e.g., one-dimensional), binary representation of the cube or matrix (if false). If the function returns the character representation of the string, the function uses the xAxis[x] function to retrieve the character value at the index position of the encoding array corresponding to the index position of the x-axis of the matrix (or cube) where a value of '1' is determined.

Example 12

Example Source Code for Evaluating Values of Positionally-Encoded String Representations As has been described, various rules can be implemented to determine whether a first positionally-encoded string representation "matches" a second positionally-encoded string representation. The rules can include matching discrete values, matching a discrete value to a range, and matching two ranges. FIG. 12 illustrates source code (C++) for an example function, singleToSingle, that determines whether positionally-encoded string representations exactly match. The function returns true (e.g. there is a match) if the last position in one of the cubes is reached without a mismatch being detected. Thus, this rule will consider two cubes to be equivalent if one cube is a subset of the other. If desired, the rule could be defined differently, such that both cubes must be exactly identical for a match to be returned, or that the cubes must have identical content, but can be of different sizes (e.g., one cube can have rows filled with '0' values that are not present in the other cube).

Note that, if a wildcard character is defined and detected (e.g., '*'), the function calls a resolveWildcardIn function of the cube class. Representative source code for the resolveWildcardIn function is presented in FIG. 13. The resolveWildcardIn function compares the remaining elements of both cubes being compared, returning false if any mismatches are detected (including one cube having a wildcard character and the other cube not having the wildcard character), and calling the resolveWildcardIn function again if any further wildcard characters are detected. In particular, the function looks to see if the character in the matrix without the wildcard is the same as the next non-wildcard character in the matrix with the wildcard (e.g., comparing 'i*we' to 'iwe' would return true, while comparing 'i*me' with 'iwe' would return false).

FIG. 14 presents example source code (C++) for determining whether a single value of one cube is within a range for another cube. Briefly, the function first determines whether the cubes are empty, and resolves any wildcard characters as described above. For the next non-wildcard character, it is determined whether the next characters of the cubes are numerical or alphabetical. If the values are numerical, the number in each cube is determined by reading the cube elements until a non-numerical value is encountered (e.g., *8320 k would be read as 8320). One of the cubes should have a numerical range, that is, the matrix at layer 0 and the matrix at layer 1 should both have numbers (referred to as the reference cube). The single numerical value of the test cube is then compared with the range in the reference cube. The function returns true if the function is within the range, and false otherwise. The function implements similar functionality to determine whether a letter of the test cube is within a range of the reference cube (e.g., 'c' is in the range of 'a'-'g').

Although not shown, a "range" to "range" comparison can be carried out in a similar manner as a "single to range" comparison. In particular, numerical or alphabetical ranges are determined for each cube in a similar manner as described above (e.g., using the values at layer 0 and layer 1 of a cube as the limits of the range). The ranges can then be compared to see whether they overlap. Overlap can be specified as including the endpoints or not including the endpoints (e.g., the range 2-5 overlaps the range 5-8 if endpoints are included, but not if endpoints are excluded).

Example 13

Example String Comparisons and Results

FIG. 15 presents a table 900 listing example strings for an authorization rule and an authorization token or object. The table 900 provides a column listing the results of comparing the particular strings listed in a particular row. In some cases, a row includes a single "from" value for the authorization rule and the authorization token, representing a rule where two discrete values are compared to determine whether there is a match between an authorization rule and an authorization token. In other cases, a row includes a "from" value for the authorization rule or the authorization token and both "from" and "to" values for the other. In this case, a comparison can determine whether there is a match depending on whether the single value "from" value falls within the range of the "from" and "to" values. Finally, some cases include "from" and "to" values for both the authorization rule and the authorization token. In these cases a comparison can determine whether the "from" and "to" ranges overlap (which, as described above, can be define as including endpoints or as excluding endpoints, as desired).

In carrying out the comparison, both the authorization rule and the authorization token are converted to positionally-encoded string representations, such as two-dimensional array (in the case of a "from" value only) or a three-dimensional array (in the case where both "from" and "to" values are provided). As described above, arrays can be analyzed by reducing the dimensionality of the arrays, such as by collapsing a two- or three-dimensional array into a one-dimensional array, or using a number corresponding to the one-dimensional array (e.g., a number represented by the binary values of the one-dimensional array).

Example 14

Example Method for Determining String Compliance with an Authorization Rule

Figure 16:
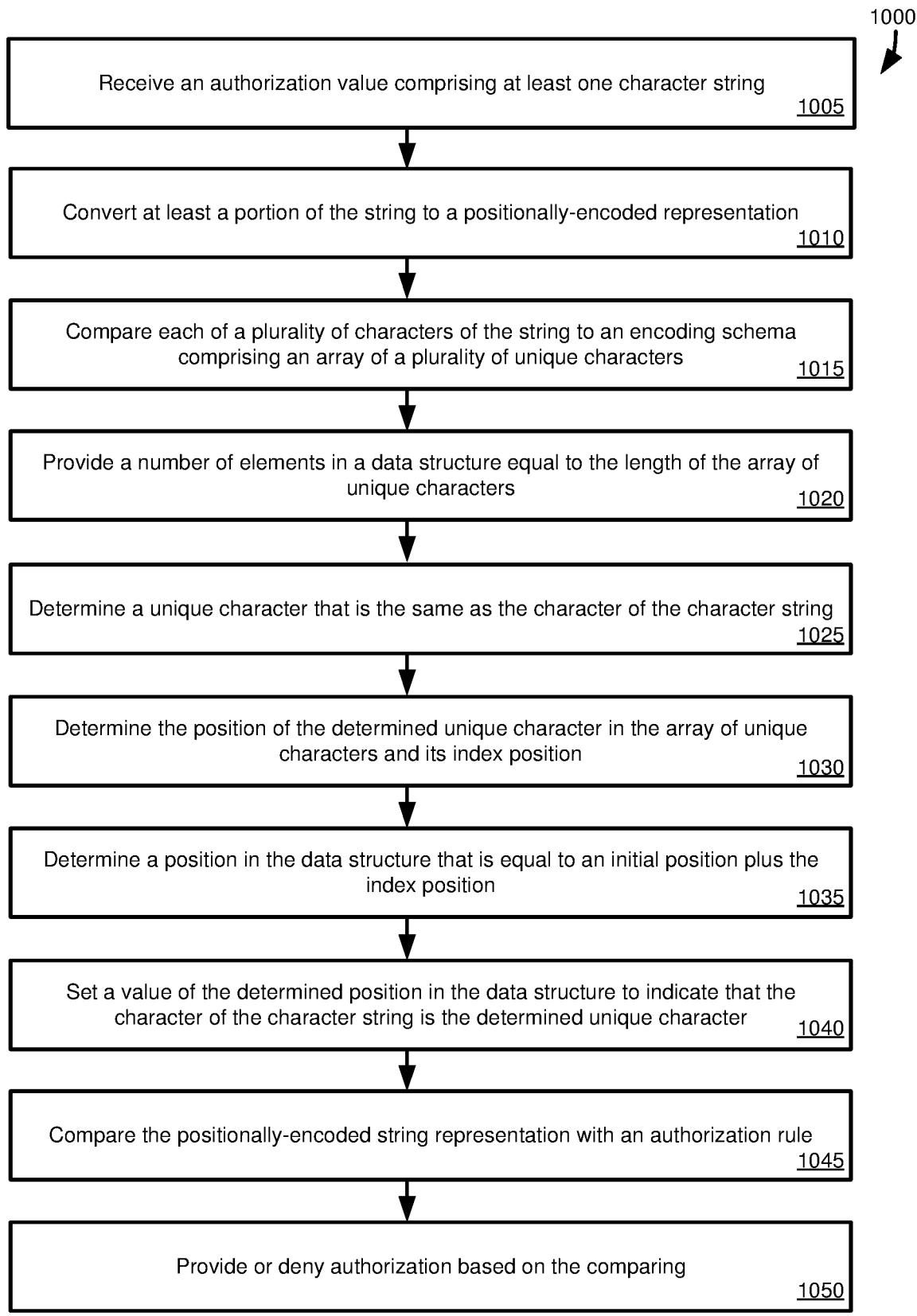
FIG. 16 is a flowchart of an example method for analyzing a string to determine whether the string complies with an authorization rule.

FIG. 16 is a flowchart of an example method 1000 for determining whether authorization exists based on comparing a positionally-encoded string representation with an authorization rule. At 1005, an authorization value is received. The authorization value includes at least one character string. At least a portion of the character string is converted to a positionally-encoded string representation at 1010. The converting includes, for each character to be converted, at 1015, comparing the character with an encoding schema. The encoding schema includes an array of unique characters, such as the unique characters from which a string may be constructed (e.g., letter, numbers, symbols, or combinations thereof). The array has a length. Each unique character has a unique position in the array.

At 1020, a number of elements in a data structure are provided that is equal to the length of the array of unique characters. The number of elements have an initial position. A unique character in the array of unique characters is determined, at 1025, that is the same as the character of the character string. At 1030, the position of the unique character in the array of unique characters is determined, the position is an index value compared with an initial position of the array of array of unique characters. The position in the data structure is determined, at 1035, that is equal to the initial position plus the index value. A value of the determined position of the data structure is set at 1040. The value indicates that the character of the character string is the determined unique character. Elements of the data structure that are not the unique character have a value that indicates that the unique character at the corresponding position in the array of unique characters is not the character of the character string.

At 1045, the positionally-encoded string representation is compared with an authorization rule to determine whether the positionally-encoded string representation meets authorization criterial. Authorization is provided or denied based on the comparing at 1050.

Example 15

Example Method for Determining Set Membership of String

Figure 17:
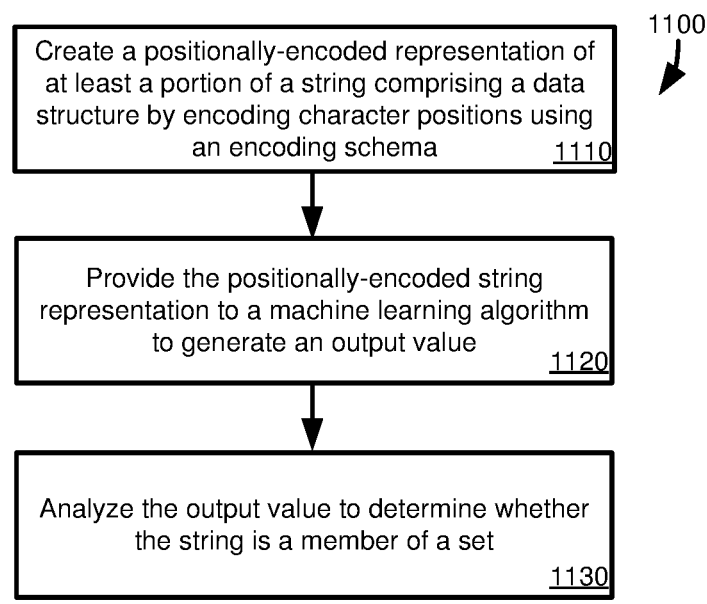
FIG. 17 is a flowchart of an example method for determining whether a string is a member of a set.

FIG. 17 is a flowchart of an example method 1100 for determining whether a string is a member of a set. At 1110, a positionally-encoded representation is created of at least a portion of a string. The string includes a plurality of characters. The positionally-encoded representation is created by encoding a data structure based on the positions of a plurality of characters of the at least a portion of the string in an encoding schema. The positionally-encoded representation can include numerical digits or Boolean values. The positionally-encoded string representation is provided to a machine learning algorithm at 1120. The machine learning algorithm provides an output value. At 1130, the output value is analyzed to determine whether the string is a member of a set.

Example 16

Figure 18:
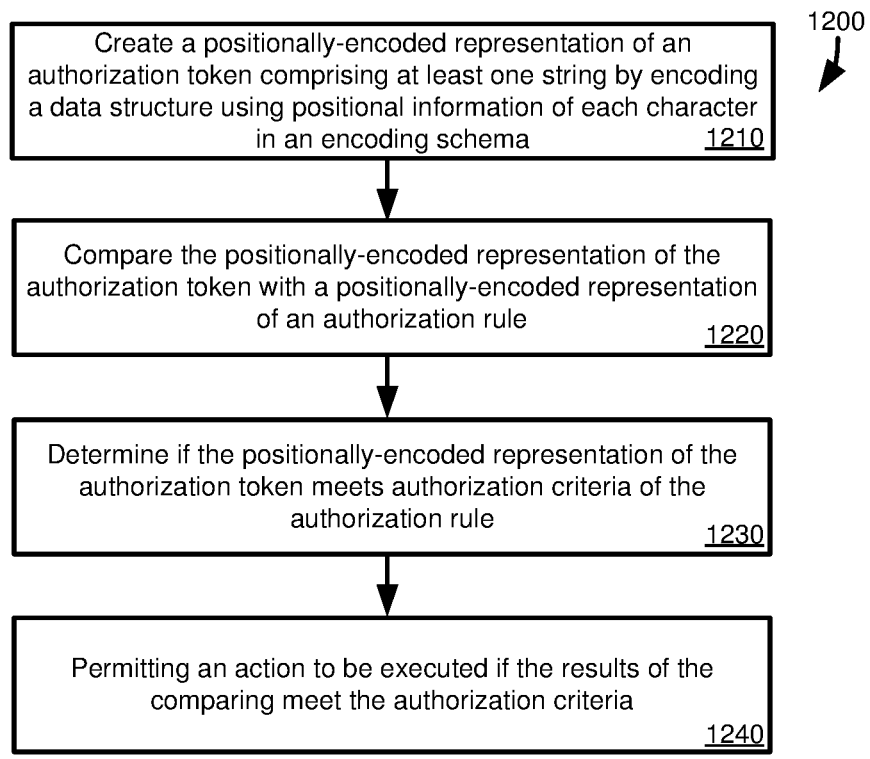
FIG. 18 is a flowchart of an example method for determining if an authorization token meets authorization criteria.

Example Method for Determining Compliance of Authorization Token with Authorization Criteria FIG. 18 is a flowchart of an example method 1200 for determining whether an action is authorized. At 1210, a positionally-encoded representation of an authorization token is created. The authorization token includes at least one string. The positionally-encoded representation is created by encoding a data structure based on the positions of a plurality of characters of at least a portion of the string in an encoding schema. The positionally-encoded representation of the authorization token is compared at 1220 with a positionally-encoded representation of an authorization rule. The authorization rule defines a set of authorized strings. At 1230, it is determined if the positionally-encoded representation of the authorization token meets authorization criteria of the authorization rule. Responsive to the comparing, such as if (or when) the results of the comparing meet the authorization criteria, at 1240, an action is permitted to be executed.

Example 17

Example Technical Solution

The technical solution of the disclosed innovations can facilitate the processing of character strings, including comparing or analyzing strings using machine learning algorithms, or using non-machine learning based techniques. However, the disclosed innovations can be particularly useful in machine learning-based approaches, as traditional character representations of strings can be unsuitable as inputs for machine learning algorithms. The disclosed positionally-encoded string representations can also preserve the ability of strings to be compared, as all character information can be retained (including positional information), and a character string representation can be reconstructed by applying an encoding schema in a reverse manner as that used to form a positionally-encoded string representations. The disclosed innovations can provide increased accuracy in comparing or otherwise analyzing strings, and can reduce processing time and required processor use. The disclosed innovations can also facilitate technical applications that would have been difficult or impossible to achieve with other approaches.

Example 18

Computing Systems

Figure 19:
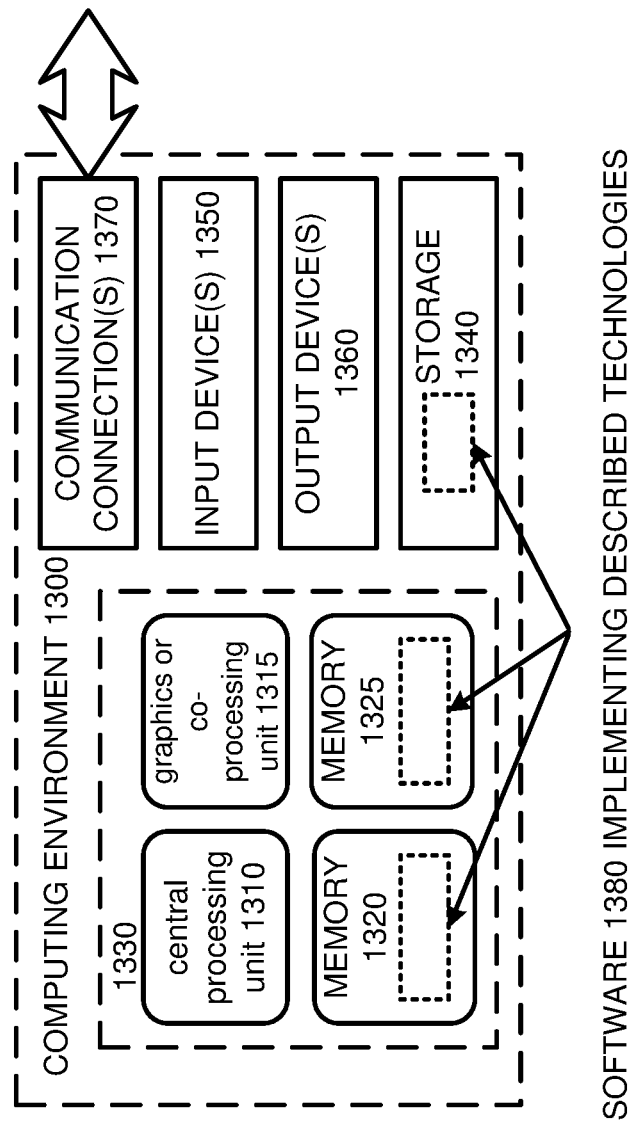
FIG. 19 is a diagram of an example computing system in which some described embodiments can be implemented.

FIG. 19 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 19, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 19 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315. The memory 1320, 1325, may also store database data, such as data associated with the database 710 of FIG. 7.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 19

Cloud Computing Environment

Figure 20:
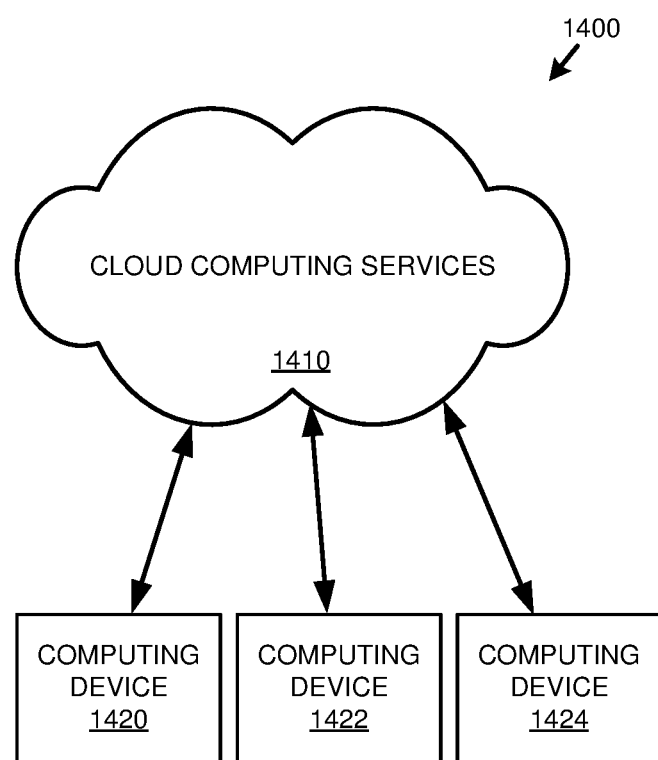
FIG. 20 is an example cloud computing environment that can be used in conjunction with the technologies described herein.

FIG. 20 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operators (e.g., data processing, data storage, and the like).

Example 20

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 19, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. In a computing system comprising at least one memory and one or more processors, a method comprising:
   receiving a request to determine whether a value comprising at least one character string complies with at least one rule;
   converting at least a portion of the character string to a first positionally-encoded string representation, the converting comprising, for each of a plurality of characters of the character string:
      comparing the character to an encoding schema, the encoding schema comprising an array of a plurality of unique characters, the array having a length, and each unique character having a unique position in the array;
      providing a number of elements in a data structure equal to the length of the array of unique characters, the number of elements having an initial position;
      determining a unique character that is the same as the character of the character string;
      determining the position of the unique character in the array of unique characters, the position being an index value compared with an initial position of the array of unique characters;
      determining a position in the data structure that is equal to the initial position plus the index value; and
      setting a value of the determined position of the data structure to indicate that the character of the character string is the determined unique character, wherein elements of the data structure that are not the unique character have a value that indicates that the unique character at the corresponding position in the array of unique characters is not the character of the character string;
   comparing at least a portion of the first positionally-encoded string representation with at least a portion of at least a second positionally-encoded string representation to determine whether the at least a first positionally-encoded string representation complies with the at least one rule;
   determining a rule compliance result based on the comparing; and
   returning the compliance result in response to the request.

2. The method of claim 1, wherein the character string comprises at least one wildcard indicator, the converting the at least a portion of the character string to a first positionally-encoded string representation further comprising:
   setting values of data structures for positions in the character string corresponding to the wildcard indicator and after the wildcard indicator to indicate that all characters in the encoding schema are present at the given position.

3. The method of claim 1, wherein determining if the comparing satisfies the at least one rule comprises interpreting numerical characters as numbers.

4. The method of claim 3, wherein numerical characters between an end point of the character string and an alphabetic character, or numerical characters between a pair of alphabetic characters, are treated as a single number.

5. A computing system that implements an analysis engine, the computing system comprising:
   one or more memories;
   one or more processing units coupled to the one or more memories; and
   one or more computer readable storage media storing instructions that, when loaded into the memories, cause the one or more processing units to perform operations for:
      receiving a request to determine whether at least a first string complies with a rule;
      creating a positionally-encoded representation of the at least a first string by encoding a data structure based on the positions of a plurality of characters of at least a portion of the at least a first string in an encoding schema;

comparing the positionally-encoded representation of the at least a first string with a positionally-encoded representation of at least a second string;

determining if the comparing satisfies the rule; and returning in response to the request an indication as to whether the rule is satisfied for the at least a first string.

6. The system of claim 5, wherein the positionally-encoded representation of the at least a first string comprises a matrix, the matrix having a first dimension at least as large as the number of the plurality of characters of the at least a portion of the at least a first string and a second dimension equal to a length of an encoding schema array of the encoding schema.

7. The system of claim 5, wherein the positionally-encoded representation of the at least a second string comprises a third string portion and a fourth string portion, the operations further comprising:

forming a cube from the third string portion and the fourth string portion, wherein the third and fourth string portions form different layers of the cube.

8. The system of claim 7, wherein the third string portion and the fourth string portion define an interval, wherein compliance with the rule is determined by determining if a value of the positionally-encoded representation of the at least a first string is within the interval.

9. The system of claim 5, wherein comparing the positionally-encoded representation of the at least a first string with the rule comprises providing the positionally-encoded representation of the at least a first string and the positionally-encoded representation of the at least a second string to a machine learning algorithm.

10. The system of claim 5, wherein the rule comprises determining whether the at least a first string is the same as the at least a second string.

11. The system of claim 5, wherein the rule comprises determining whether the at least a first string represents a subset of the at least a second string.

12. The system of claim 5, wherein the at least a first string comprises at least one wildcard indicator, the operations comprising a wildcard resolving routine comprising:

for character positions after the wildcard indicator in the at least a first string, determining whether a value of the positionally-encoded representation of the character position of the first string matches a value of a corresponding character position of the positionally-encoded representation of the at least a second string.

13. The system of claim 12, the operations further comprising:

determining that a character position value of a character position after the wildcard indicator in the at least a first string comprises another wildcard indicator and executing the wildcard resolving routine for the another wildcard indicator.

14. The method of claim 5, wherein the at least a first string is of a non-numerical datatype.

15. The system of claim 5, wherein the at least a first string comprises a first third string and a fourth string, the third string and the fourth string specifying a range of string values.

16. The system of claim 15, wherein the encoding schema identifies an order in a character set used to define strings, and the third string specifies a first character in the sequence, the fourth string specifies a second character in the sequence, and the range comprises characters positionally located between the first and second characters.

17. The system of claim 16, wherein the third string and the fourth string form layers in a positionally-encoded cube.

18. One or more tangible computer-readable storage media storing:

computer-executable instructions receiving a request to analyze a character string;

computer-executable instructions converting at least a portion of the character string to a first positionally-encoded string representation, the converting comprising, for each of a plurality of characters of the character string:

computer-executable instructions comparing the character to an encoding schema, the encoding schema comprising an array of a plurality of unique characters, the array having a length, and each unique character having a unique position in the array;

computer-executable instructions providing a number of elements in a data structure equal to the length of the array of unique characters, the number of elements having an initial position;

computer-executable instructions determining a unique character that is the same as the character of the character string;

computer-executable instructions determining the position of the unique character in the array of unique characters, the position being an index value compared with an initial position of the array of unique characters;

computer-executable instructions determining a position in the data structure that is equal to the initial position plus the index value; and computer-executable instructions setting a value of the determined position of the data structure to indicate that the character of the character string is the determined unique character, wherein elements of the data structure that are not the unique character have a value that indicates that the unique character at the corresponding position in the array of unique characters is not the character of the character string;

computer-executable instructions conducting the requested analysis using the first positionally-encoded string representation; and computer-executable instructions returning analysis results in response to the request.

19. The one or more tangible computer-readable storage media of claim 18, wherein the computer-executable instructions conducting the requested analysis comprise submitting the first positionally-encoded string representation to a machine learning algorithm.

20. The one or more tangible computer-readable storage media of claim 19, wherein the machine learning algorithm is a classification algorithm or a clustering algorithm and the analysis results comprise a classification or a cluster identifier.

* * * * *